(12) United States Patent
Fischer et al.

(10) Patent No.: US 8,090,930 B2
(45) Date of Patent: Jan. 3, 2012

(54) METHOD AND CIRCUITS FOR EARLY DETECTION OF A FULL QUEUE

(75) Inventors: Timothy Charles Fischer, Maynard, MA (US); Daniel Lawrence Leibholz, Cambridge, MA (US); James Arthur Farrell, Harvard, MA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1813 days.

(21) Appl. No.: 10/356,943

(22) Filed: Jan. 31, 2003
(Under 37 CFR 1.47)

(65) Prior Publication Data
US 2003/0120898 A1 Jun. 26, 2003

Related U.S. Application Data

(63) Continuation of application No. 09/465,689, filed on Dec. 17, 1999, now Pat. No. 6,542,987.

(60) Provisional application No. 60/118,130, filed on Feb. 1, 1999.

(51) Int. Cl.
*G06F 9/315* (2006.01)
*G06F 13/40* (2006.01)
*G06F 13/20* (2006.01)

(52) U.S. Cl. ............ 712/215; 711/144; 710/54

(58) Field of Classification Search .......... 711/123, 711/125, 144, 140, 156; 710/54, 55; 712/217, 712/206, 245, 207, 215, 219
See application file for complete search history.

(56) References Cited

U.S. PATENT DOCUMENTS

| | | | |
|---|---|---|---|
| 4,229,790 A * | 10/1980 | Gilliland et al. | ............ 709/101 |
| 4,847,755 A | 7/1989 | Morrison et al. | |
| 5,155,843 A | 10/1992 | Stamm et al. | |
| 5,627,983 A | 5/1997 | Popescu et al. | |
| 5,822,559 A | 10/1998 | Narayan et al. | |
| 5,870,578 A | 2/1999 | Mahalingaiah et al. | |
| 5,872,946 A | 2/1999 | Narayan et al. | |
| 6,112,019 A | 8/2000 | Chamdani et al. | |
| 6,115,807 A | 9/2000 | Grochowski | |
| 6,542,987 B1 * | 4/2003 | Fischer et al. | ............... 712/217 |

OTHER PUBLICATIONS

Keller, J., "The 21264: A Superscalar Alpha Processor with Out-of-Order Execution," Paper presented at the Microprocessor Forum on Oct. 22-23, 1996.

(Continued)

*Primary Examiner* — Daniel H. Pan

(57) ABSTRACT

In a pipelined computer architecture in which instructions may be removed from the instruction queue out of sequence, instruction queue status at a cycle K is determined by adding together the number of invalid instructions or free rows in the queue during cycle K−2, the number of instructions issued for cycle K−1 and the number of instructions speculatively issued in cycle K−1 that have produced a cache hit, and subtracting from the sum the number of instructions enqueued for cycle K−1. The result indicates the number of invalid instructions in the queue cycle K. The number of invalid entries instructions, the number of issued instructions, and the number of enqueued instructions are preferably represented as flat vectors, so that adding is performed by shifting in one direction, while subtracting is performed by shifting in the opposite direction. The result is compared with either the number of instructions to be enqueued in the present cycle, which number is encoded, or with a predetermined value. A stall signal is generated if the indicative value is less than the encoded number or the predetermined value.

21 Claims, 18 Drawing Sheets

OTHER PUBLICATIONS

Gieseke, B.A., et al., "A 600MHz Superscalar RICS Microprocessor with Out-of-Order Execution," Paper presented at the IEEE International Solid-State Circuits Conference (Feb. 1997).

Farrell, J.A. and Fischer, T.C., "Issue Logic for a 600-MHz Out-of-Order Execution Microprocessor," *J. Solid-State Circuts 33*(5):707-712 (1998).

Scott, A.P., et al., "Four-Way Superscalar PA-RISC Processors," *J. Hewlett-Packard 1*:1-9 (Aug. 1997).

Farrell, J.A. and Fischer, T.C., "Issue Logic for a 600 MHz Out-of-Order Execution Microprocessor," Symposium on VLSI Circuits Digest of Technical Papers, pp. 11-12 (1997).

Gwennap, L., "Digital 21264 Sets New Standard: Clock Speed, Complexity, Performance Surpass Records, But Still a Year Away," *Microprocessor Report 10*(14):1-12 (Oct. 28, 1996).

"A Tour of the P6 Microarchitecture" http://eecad.sogang.ac.kr/AboutSite+Others/Others/intel/procs/p6/p6white/p6white.htm.

"A 56-Entry Instruction Reorder Buffer," http://www.hp.com/ahp/framed/technology/micropro/micropro/pa-8000/docs/56entry.html.

Fischer, T. and Leibholz, D., "Design Tradeoffs in Stall-Control Circuits for 600MHz Instruction Queues," Paper presented at the IEEE International Solid-State Circuits Conference (Feb. 1998).

Kessler, R.E., Compaq Computer Corporation, "The Alpha 21264 Microprocessor," *IEEE Micro* 24-36 (Mar.-Apr. 1999).

Liebholz, Daniel and Razdan, Rahul, Digital Equipment Corporation, "The Alpha 21264: A 500 MHZ Out-of-Order Execution Microprocessor," from Compcon Feb. 1997 Proceedings.

Popescu, V. et al., "The Metaflow Architecture," *IEEE Micro*, 11(3):10-13, 63-73 (1991).

\* cited by examiner

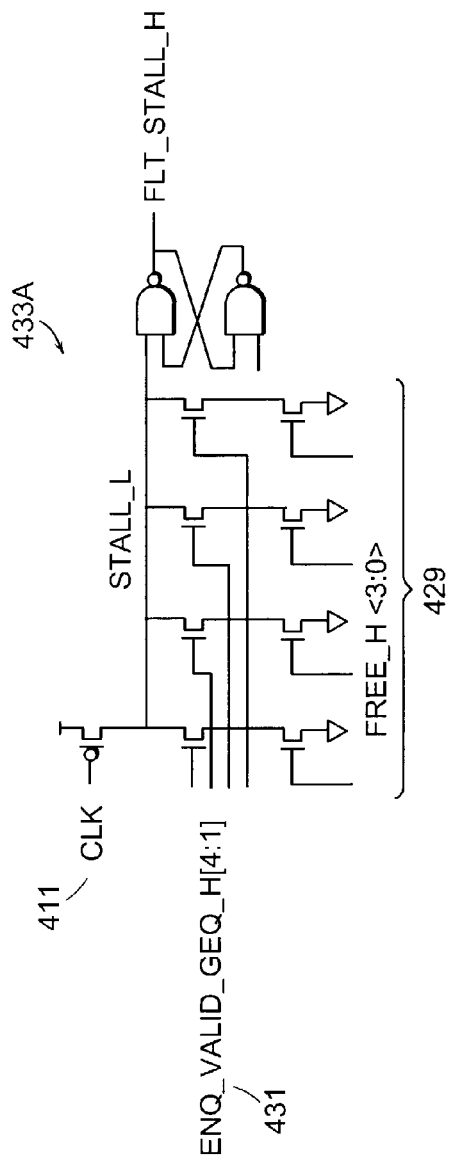
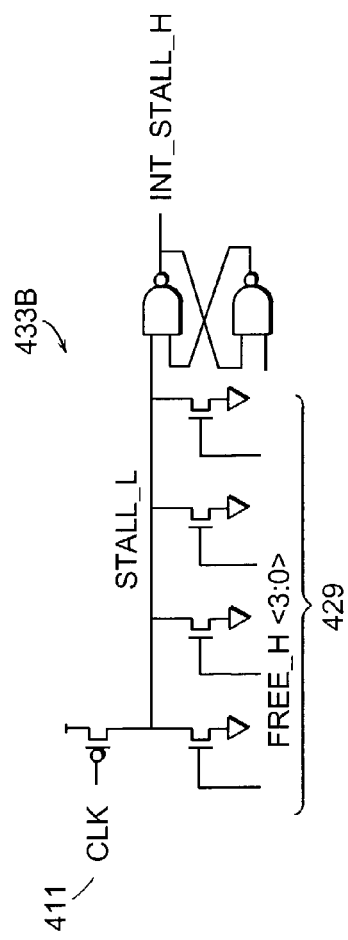
FIG. 16A
FIG. 16B

METHOD AND CIRCUITS FOR EARLY DETECTION OF A FULL QUEUE

RELATED APPLICATION(S)

This application is a continuation of U.S. application Ser. No. 09/465,689, filed Dec. 17, 1999, now U.S. Pat. No. 6,542,987, which claims the benefit of U.S. Provisional Application No. 60/118,130, filed Feb. 1, 1999. The entire teachings of the above application(s) are incorporated herein by reference.

BACKGROUND OF THE INVENTION

An instruction queue is typically a random-access storage array which holds instructions between the time they are fetched from memory and when they are issued to an execution unit. The queue is typically structured as a set of rows, each of which holds one instruction.

In many modern microprocessors, instructions issue from the instruction queue out-of-order, with instruction prioritization managed with pointers to the oldest and newest instructions in the queue. The concept of out-of-order execution is also called "dynamic execution" or "dynamic scheduling". The queue structure itself may also be called an "instruction buffer", "re-order buffer", or "scoreboard".

In some CPUs, for example, the instruction queue is called a "Re-order Buffer." There are two buffers, one for ALU instructions and one for memory operations, each containing twenty-eight entries. Instructions remain in a buffer from the time they are fetched until they are retired, and are not removed at issue time. Instructions are inserted into a queue in a round-robin fashion based on the "newest" instruction pointer.

Other instruction queue architectures, sometimes called re-order buffers, appear to hold twenty-four instructions through similar execute and retirement operations.

Other out-of-order issue machines with a 16-entry or larger re-order buffer track the status of each in-flight instruction, and twelve integer and eight floating-point "rename buffers" assign instructions to execution units. Each execution unit has a "reservation station," that is, an instruction buffer dedicated to an execution unit from which data-ready instructions are issued.

SUMMARY OF THE INVENTION

In processors with out-of-order instruction queues, the instruction input pipeline must stall when the queue is full. Traditional queue-full mechanisms rely on a threshold indicator which asserts a pipeline stall signal when the number of instructions in the queue reaches a fixed level. This signal is typically based on pointer comparisons, and the fixed threshold must be reached before the queue is determined to be completely filled, thus wasting queue space.

The present invention does not use pointers to manage queue allocation and prioritization, and hence, the above scheme is not generally applicable. Instead, a pipelined detection scheme is used which first counts the number of free queue slots, and then modifieds this count based on queue events which free or allocate queue space each cycle. The resulting free-entry count is then used in one of two ways.

In a floating point queue, the queue-free-slot count is compared to the number of instructions entering that cycle. Pipeline stall is asserted if there are not enough free slots available for the entire entering instruction block.

In an integer queue, a simpler, faster scheme is used which stalls the pipeline if there are less than a predetermined number of free queue entries in any cycle, regardless of the number of instructions in the enqueue stage that cycle.

At least one computer system employing the present invention has a 20-row integer queue and a 15-row floating-point queue. Each cycle, up to four instructions can be issued from the integer queue, and up to four new instructions can enter the queue. Up to two instructions can be issued from and can enter the floating-point queue. Instructions are removed from the queues two cycles after they are issued, creating empty queue rows. New instructions can enter the queue only when there are a sufficient number of empty rows in which to place the instructions. If there are not a sufficient number of empty rows, the input pipeline is stalled.

Instructions in the queue are prioritized to ensure that all instructions are issued from the queue in a finite amount of time, thus preventing deadlock as well as meeting performance goals by issuing oldest instructions first.

In a preferred embodiment, older instructions in a queue are compacted toward the bottom of the queue each cycle, while their original order is maintained. An update logic circuit generates control signals to perform the compaction. Compaction creates room at the top of the queue where new instructions enter. Maintaining instructions in-order from the bottom to the top of the queue eliminates the need for pointers to track oldest/newest queue instructions, and greatly simplifies the issue prioritization process, allowing the use of fast, simple arbitration circuits.

Because instructions are issued out-of-order, removal of instructions from the queue leaves empty, or invalid, rows scattered throughout the queue. The remaining, i.e., valid, instructions are physically compacted in the queue toward the bottom each cycle. This leaves empty queue rows toward the top of the queue, where they are filled with instructions entering in subsequent cycles.

This operation can be simplified by moving instructions at most a predetermined number of rows lower each cycle. For example, since no more than four instructions enter the integer instruction queue each cycle, maximum input bandwidth is guaranteed if the predetermined number is four.

Instructions are moved through the queue via multiplexors associated with each queue row. In the integer queue, each multiplexor has five data inputs. For queue row N, the inputs correspond to the contents of rows N through N+4. An instruction in row N+2 is moved to row N by asserting the "N+2" multiplexor select signal. An update logic circuit generates each row's multiplexor selects to control the compaction of the queue.

In a fast computer system, e.g., one having a clock frequency on the order of 600 MHz, simplifying the arbitration stage, i.e., the primary critical path in the issue logic, is essential to meeting performance goals. Adding an extra stage of logic to the issue signal critical path to prioritize instructions based on pointers would mean running at a much slower cycle time, reducing the performance of the entire machine.

In a preferred embodiment, update logic used to compact the queue provides a count of free queue rows in cycle $K-2$ to the full-queue detection circuit. The number of instructions issued in cycle $K-1$ is added to the free row count. Next, the number of instructions enqueued in cycle $K-1$ is subtracted from the sum of the free row count and the issue count. Finally, the number of speculatively issued instructions issued in cycle $K-1$ which produce a cache hit is added to the above remainder.

The counting, addition and subtraction operations can be simplified by using flat-vectors to represent counts and shifting operations to increment and decrement the counts.

The result is then encoded and compared with the number of incoming instructions. Alternatively, to save space, the number of free rows in the queue is compared with a predetermined value, preferably the maximum number of incoming instructions allowed.

Accordingly, in a pipelined computer architecture in which instructions may be removed from the instruction queue out of sequence, a method for detecting instruction queue status at a cycle K comprises adding together the number of invalid instructions or free rows in the queue during cycle K−2, the number of instructions issued for cycle K−1 and the number of instructions speculatively issued in cycle K−1 that have produced a cache hit, and subtracting from the sum the number of instructions enqueued for cycle K−1.

The result of this calculation indicates the number of invalid instructions in the queue cycle K.

The number of invalid entries instructions, the number of issued instructions, and the number of enqueued instructions are each preferably represented as a flat vector. Adding can therefore be performed by shifting in one direction, while subtracting can be performed by shifting in the opposite direction.

If the result of the calculated value indicates that the queue is full, a stall signal is generated.

Alternatively, a stall signal can be generated if the indicative value is less than a predetermined value, where the predetermined value is equal to or otherwise related to the maximum number of instructions that can be enqueued in one cycle.

In yet another alternative, a stall signal can be generated if the number of instructions to be enqueued is greater than the indicative value.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 16A is a simplified schematic of the comparator of FIG. 13 used with the floating-point queue.

FIG. 16B is a simplified schematic of the comparator of FIG. 13 used with the integer queue.

DETAILED DESCRIPTION OF THE INVENTION

Figure 1:
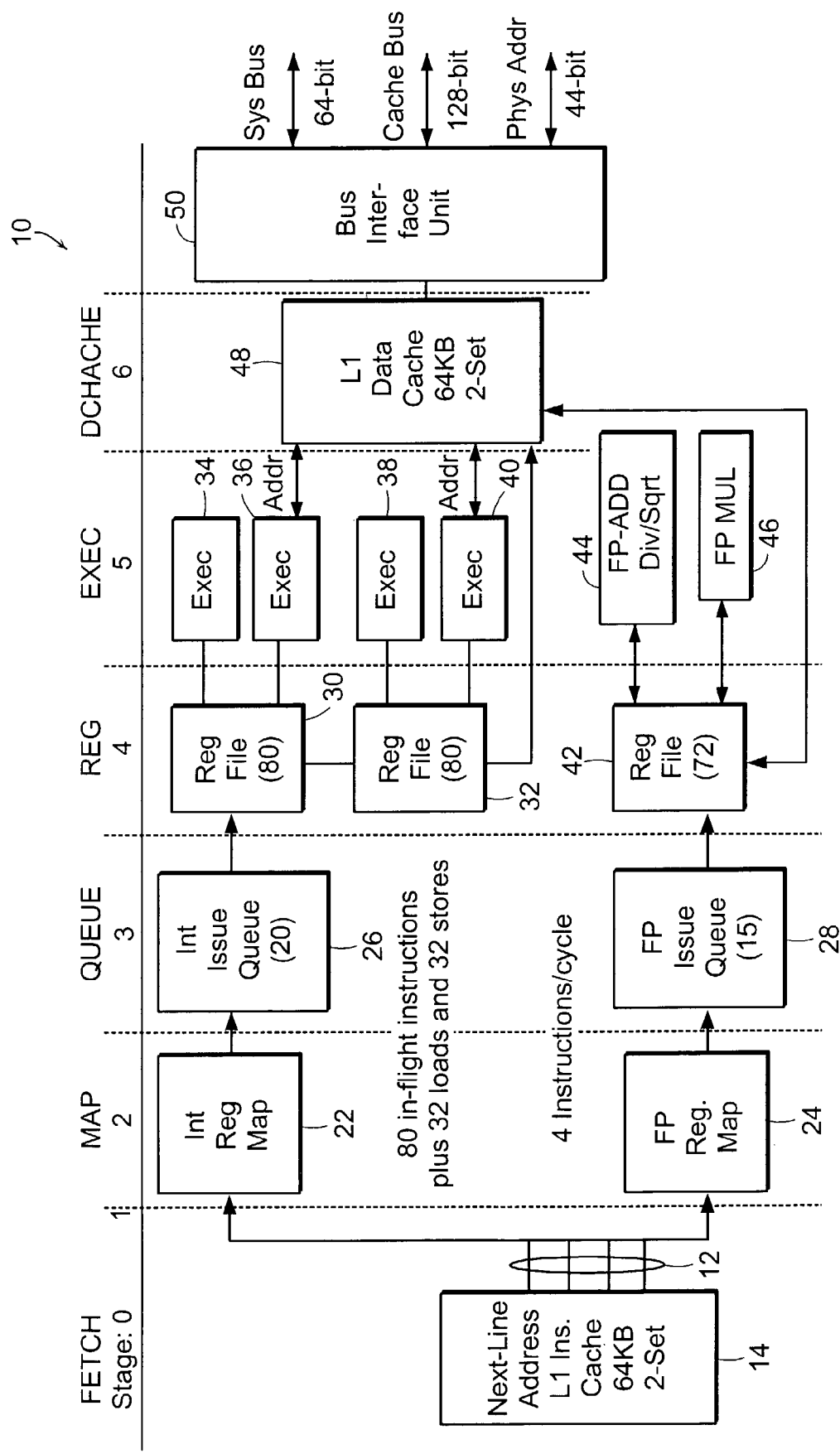
FIG. 1 is a block diagram illustrating the pipeline stages of a CPU to which the present invention is applied.

FIG. 1 is a block diagram illustrating the pipeline stages of a CPU 10 in which the present invention is implemented. Specifically, during fetch stages 0 and 1, four instructions 12 are fetched per machine cycle from the instruction cache 14.

Mapping pipeline stage 2 assigns the virtual registers identified in the fetched instruction to physical registers maintained in the CPU 10. In the preferred embodiment, four instructions are renamed per cycle, assigning up to eight source and four destination registers. Further, there are eighty physical integer registers and seventy-two physical floating point registers. These mappings are performed in a separate integer register mapper 22 and a floating point register mapper 24.

Queue pipeline stage 3 issues instructions out-of-order when data is ready, i.e., when the registers containing the data are available. In the preferred embodiment, there are twenty instruction rows in the integer queue 26 and fifteen instruction rows in the floating point queue 28. Four integer instructions issue per cycle, and up to two floating point instructions issue per cycle.

Instructions leave the queues after they issue and the empty rows are marked as invalid. Valid flags or indicators are maintained in valid indicator storage locations. A valid indicator storage location is associated with each queue row.

In register pipeline stage 4, dual integer register files 30, 32 pass the data required by the issued instructions to four integer execution units 34-40. In a similar fashion, floating point register file 42 passes the required data for the floating point instructions to floating point divide/squareroot unit 44 and floating point multiply unit 46.

Two of the integer execution units 36, 40 have the capability to issue addresses to data cache 48, enabling two load/stores per cycle. The data cache 48 communicates off-chip via the bus interface 50.

Figure 2:
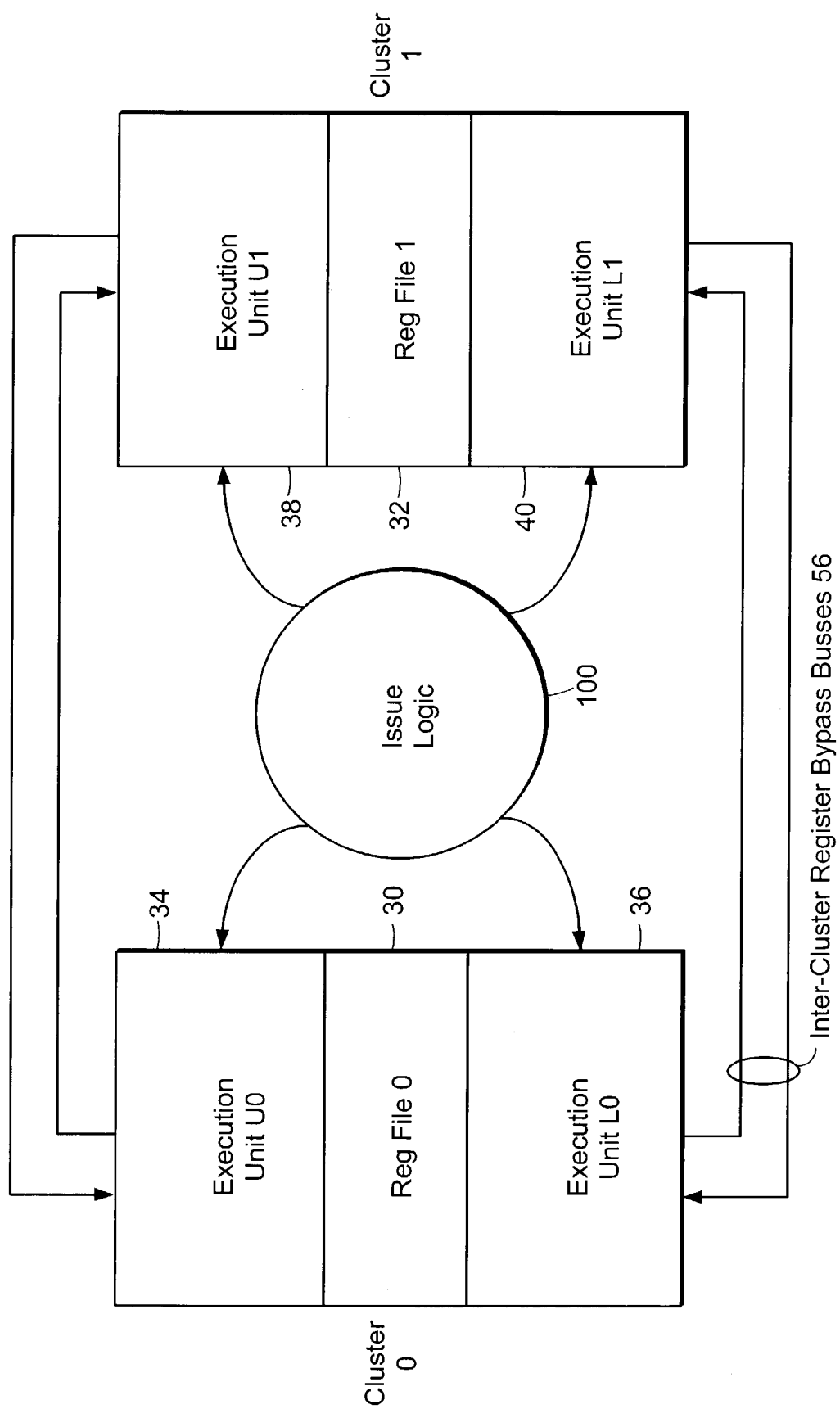
FIG. 2 is a block diagram showing the relationship between the issue logic, update logic, and execution units of the CPU.

FIG. 2 shows the general layout for integer execution. Four integer execution units 34-40 are arranged in two clusters, Cluster 0 and Cluster 1. Each cluster contains a complete copy of the register file: register file 0 30 and register file 1 32. The physical distance between the clusters requires that one cycle of latency exist between the conclusion of an operation in one cluster and the availability of the destination register in the other cluster. Register result data crosses between the clusters in intercluster register bypass buses 56.

The issue logic 100 schedules instructions to minimize the inter-cluster latency. The instructions are statistically assigned to request either the upper or lower pairs of execution units. This allows the instructions to have an opportunity to issue on the same cluster that produces the dependent register.

Figure 3:
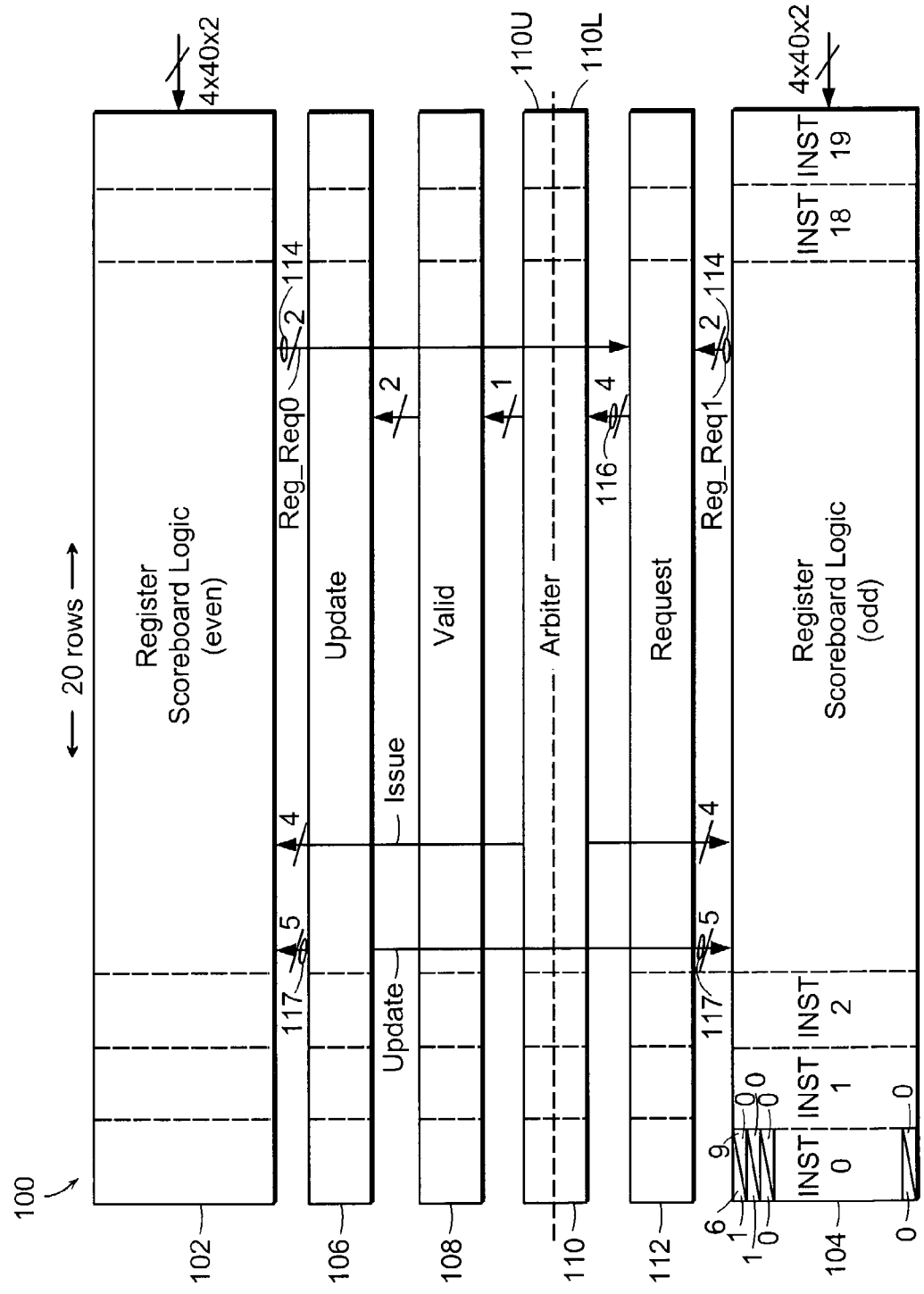
FIG. 3 is a block diagram describing the organization of the issue logic.

FIG. 3 shows the issue logic data path for the instruction queue. It contains twenty rows, one instruction occupying each row. The instructions are ordered from the oldest, INST0, at the bottom to the newest, INST19, in row 19, at the top. Up to four instructions enter the instruction queue per cycle, requiring compaction of the instructions remaining in the queue toward the bottom every cycle.

Register scoreboard logic is divided in halves 102, 104 book-ending the update 106, valid 108, arbiter 110, and request logic 112. Register scoreboard logic 102 holds the forty even registers and register scoreboard logic 104 holds the odd registers of the eighty integer physical registers, in the preferred embodiment.

For every instruction and each potential register required by the instructions, the register scoreboard logic holds two decoded fields (see fields a, b in register score board logic 104 at instruction INST0). The lower field is the decoded source register, and the upper field is the decoded destination register. Each cycle, the source field is compared to outstanding destination register numbers and a match signal is generated on one of two register request wires 114 running across the data path.

The request logic 112 stores execution unit assignment information. Each of the execution units 34-40 may execute different instructions or may or may not have access to the data cache 48. The request logic combines the execution assignment information with the two register request signals 114. The output is a four bit field 116 that indicates the execution units requested to the arbiter 110 by each row/instruction.

The arbiter 110 contains two pick-oldest-two arbiter circuits operating in parallel to choose up to four instructions each cycle for execution.

The valid logic 108 maintains a valid bit for each row and pulls one of the request lines when invalid. It calculates a new valid bit each cycle based on issue, invalidate, and reset information.

Finally, the update logic 106 accepts five new valid bits each cycle and generates five select signals 117 used to compact the instructions in the queues 102, 104.

Figure 4:
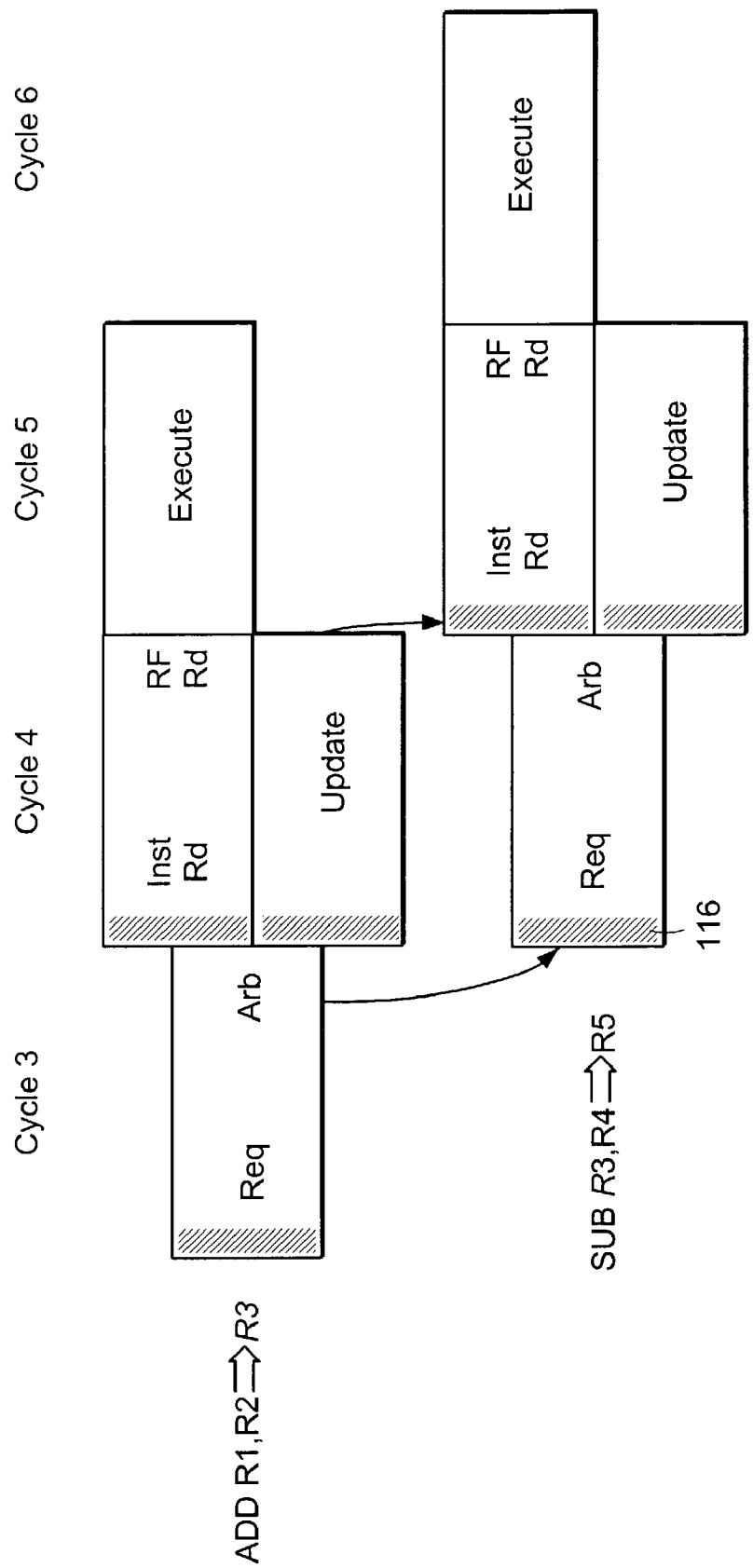
FIG. 4 is a timing diagram illustrating the register request, arbitration, scoreboard update, and instruction execution.

FIG. 4 is a timing diagram showing the progress of instructions from request to execution. In the illustrated example, ADD enters the queue, requests an execution unit, and wins the arbitration by the end of machine cycle 3, i.e., request and arbitration occur within one machine cycle. The issue signal is an index into the array with the instruction data enabling the instruction read in cycle 4. Passage of the instruction to the execution unit enables the register file read in the end of cycle 4 and the instruction execution in cycle 5.

Next, the SUB instruction can request to issue in cycle 4 since in the present invention, issuance of single cycle instructions makes available the corresponding registers for the next machine cycle. In this case, destination register R3 of ADD will be reflected as available in the scoreboard logic 102, 104 for the subsequent SUB, which uses R3 as the source register.

The issued instructions participate in the update calculation, which will overwrite that row in cycle 4 for the ADD and cycle 5 for the SUB, since in those cycles the corresponding instructions have exited the queue. This provides queue compaction at the beginning of each cycle as indicated by shaded region 116. The update logic calculates multiplexor select signals from valid states of the instructions in the queue and moves enough instructions to the bottom of the queue to free up to four rows at the top for newly fetched instructions.

Queue Compaction

Figure 5:
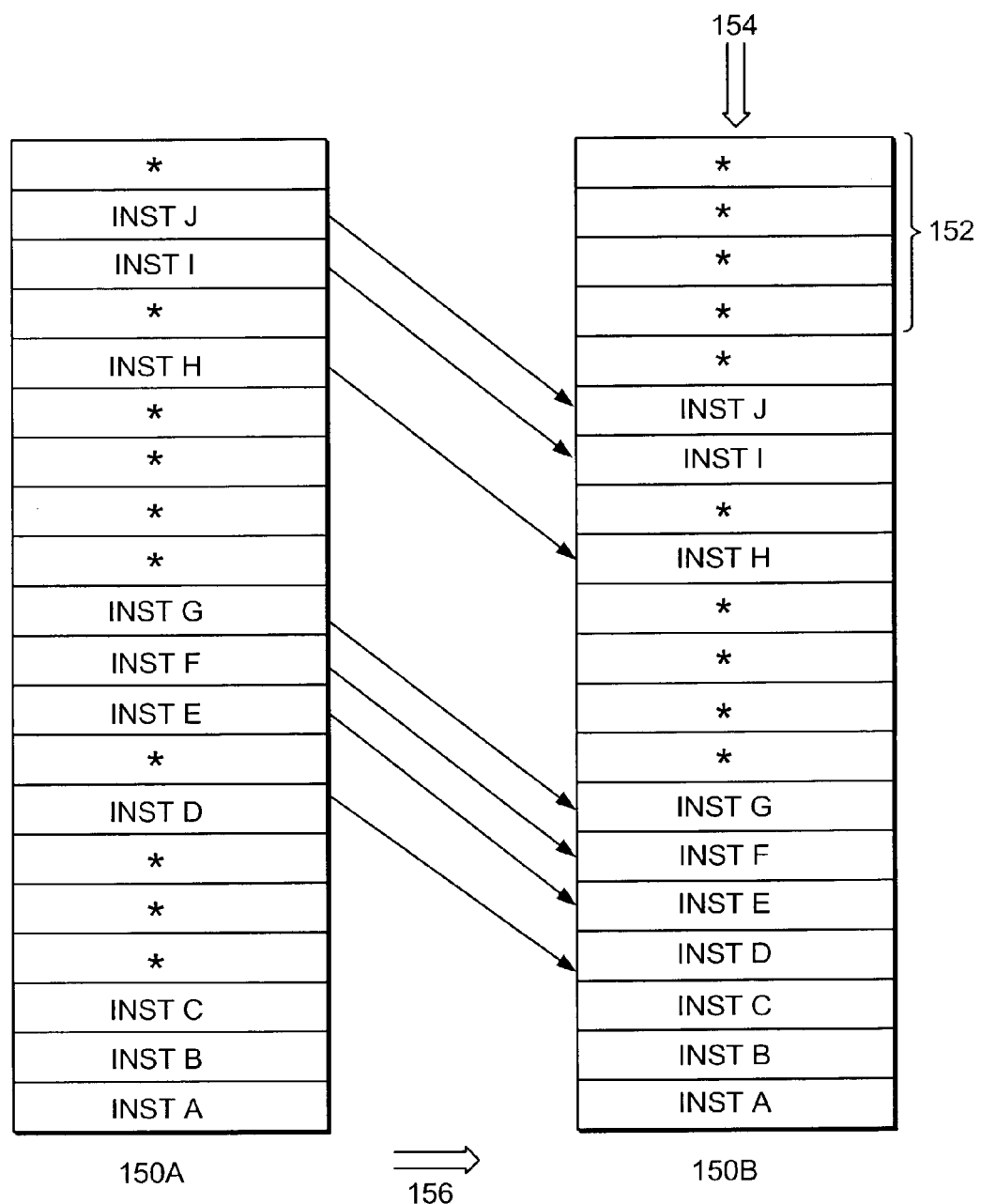
FIG. 5 is a schematic diagram illustrating the instruction queue compaction process of the present invention

FIG. 5 illustrates the instruction queue compaction process 156. For example, before compaction, the instruction queue 150A holds several valid instructions, INST A-INST J. Since instructions are issued out-of-order, removal of instructions from the queue leaves empty, or invalid, rows, indicated by asterisks (*), scattered throughout the queue 150A.

Each cycle, the remaining valid instructions INST A-INST J are physically compacted in the queue, toward the bottom, i.e., row 0, resulting in the queue as shown at 150B. In a preferred embodiment, compaction is simplified by moving instructions at most four rows each cycle. Because no more than four instructions enter the queue each cycle, the first four empty rows 152 will always be at the top of the queue. Thus, up to four new instructions are placed at the top of the queue, at 154, each cycle.

Figure 6:
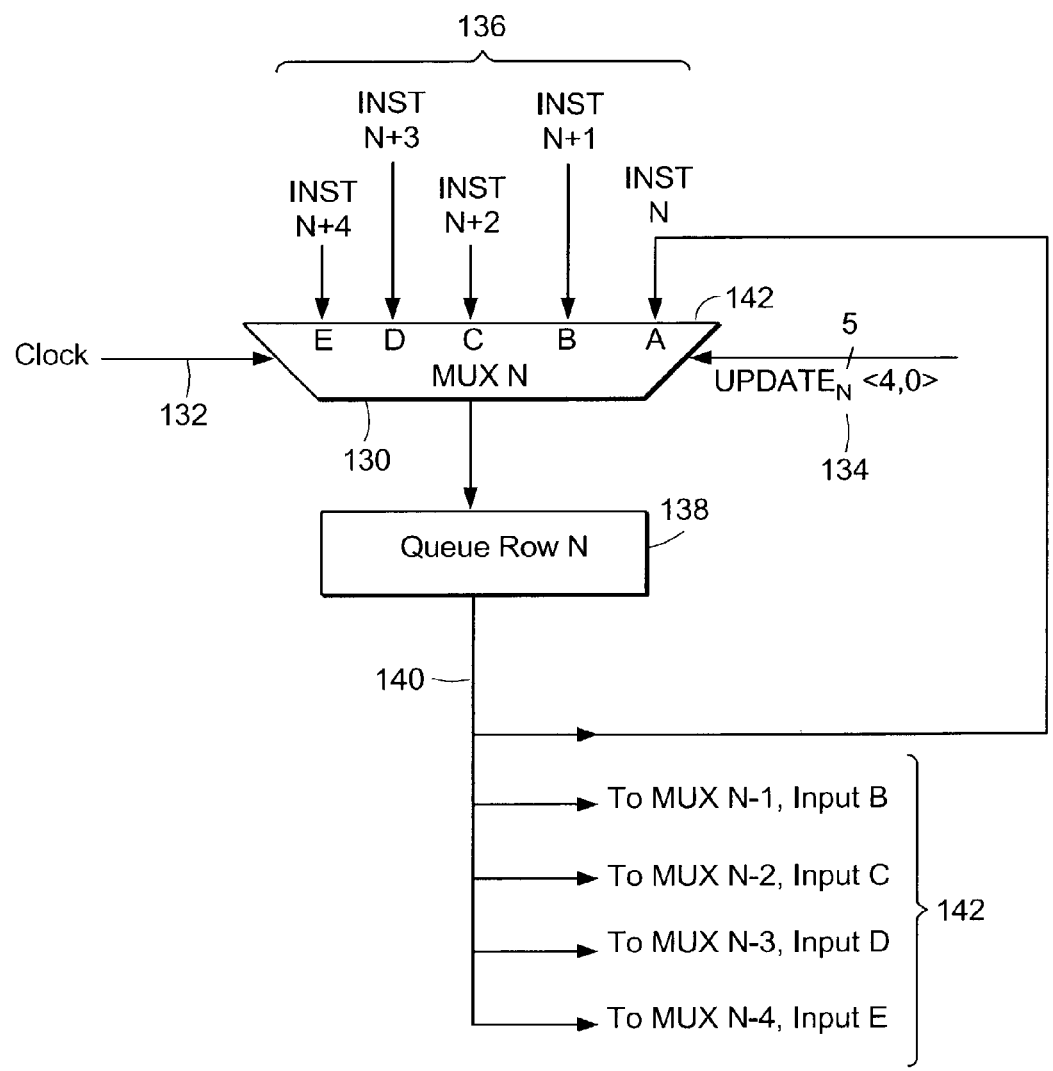
FIG. 6 is a schematic diagram illustrating one of the multiplexors which move instructions through the queue.

FIG. 6 illustrates one of the multiplexors 130 which move instructions through the queue. Preferably, one multiplexor is associated with each queue row. Here, queue row N 138 is shown with its associated multiplexor 130.

In the illustrated embodiment, each multiplexor has five data inputs 136. For row N, for example, these inputs 136 correspond to the instructions stored in rows N through N+4. One of the input instructions is selected by the multiplexor 130 and passed to queue row N 138. Five select signals UPDATE<4-0>134, generated for each row by the update logic circuit 106 (FIG. 3), determine which of the five input instructions 136 will be moved to row N. For example, an instruction at row N+2 is moved two rows lower to row N by asserting the UPDATE<2> select signal to the multiplexor 130 for row N.

Note that each instruction stored in the queue forms an input to its own multiplexor as well as the multiplexors associated with the four rows immediately below. For example, the contents 140 of queue row N, is routed to multiplexors associated with rows N−1, N−2, N−3 and N−4, as shown at 142.

The update logic circuit 106 (FIG. 3) generates each row's multiplexor select signals to control the compaction of the queue. For each queue row, the update logic circuit counts the number of invalid rows from the bottom of the queue up to and including the instant row. This count saturates at four in the illustrated embodiment since instructions are shifted at most by four rows per cycle.

Figure 7:
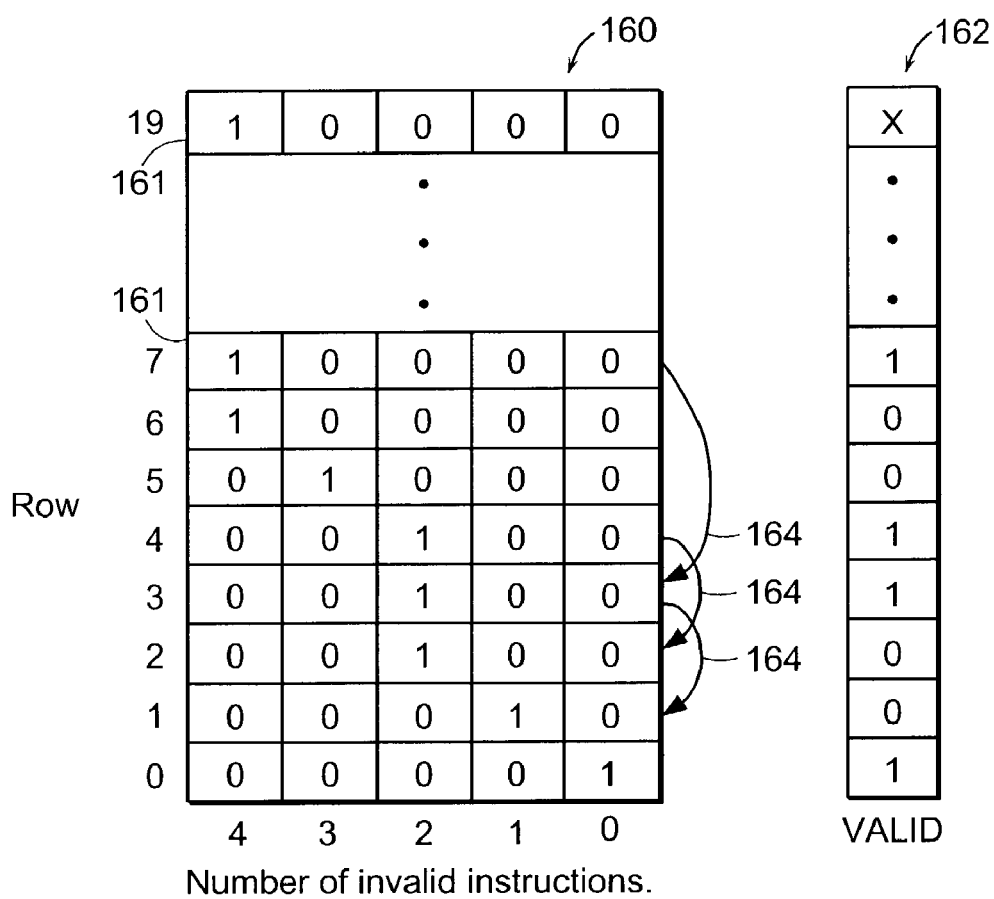
FIG. 7 is a schematic diagram illustrating the counters and valid bits associated with each queue row.

FIG. 7 illustrates the counters and valid bits associated with each queue row, where each counter is a flat vector. That is, for each row, five count bits are generated, only one of which is set at any time. Here, each counter 161 of counter block 160 is a vector counter associated with the corresponding queue row. In any counter, the position of the set bit indicates the number of invalid rows in the queue from that row to the bottom of the queue. Valid indicator storage locations 162 hold valid indicators associated with each queue row are also shown, a 1 here indicating a valid instruction in the corresponding queue row.

For example, row 0's valid indicator is 1, indicating that row 0 in the queue holds a valid instruction. Since there are no invalid instructions below, the bit corresponding to a count of 0 is set, and row 0's counter is <00001>.

Row 1 is empty, so the corresponding valid indicator is 0. Thus, there is one empty instruction up to and including row 1, so the bit corresponding to a count of 1 is set, yielding a counter value of <00010> for row 1.

As can be seen from rows 6 and up, the counters saturate at a value of 4, i.e., <10000>. As indicated by the arrows 164, each valid instruction is moved toward the bottom of the queue by the number of rows indicated by the corresponding counter.

Preferably, for each row in the queue, for example, row N, the update logic circuit 106 forms five multiplexor select signals, UPDATE<4:0> from counters 161 associated with rows N through N+4, and drives the select signals across the entire queue datapath at the start of each new cycle.

Figure 8:
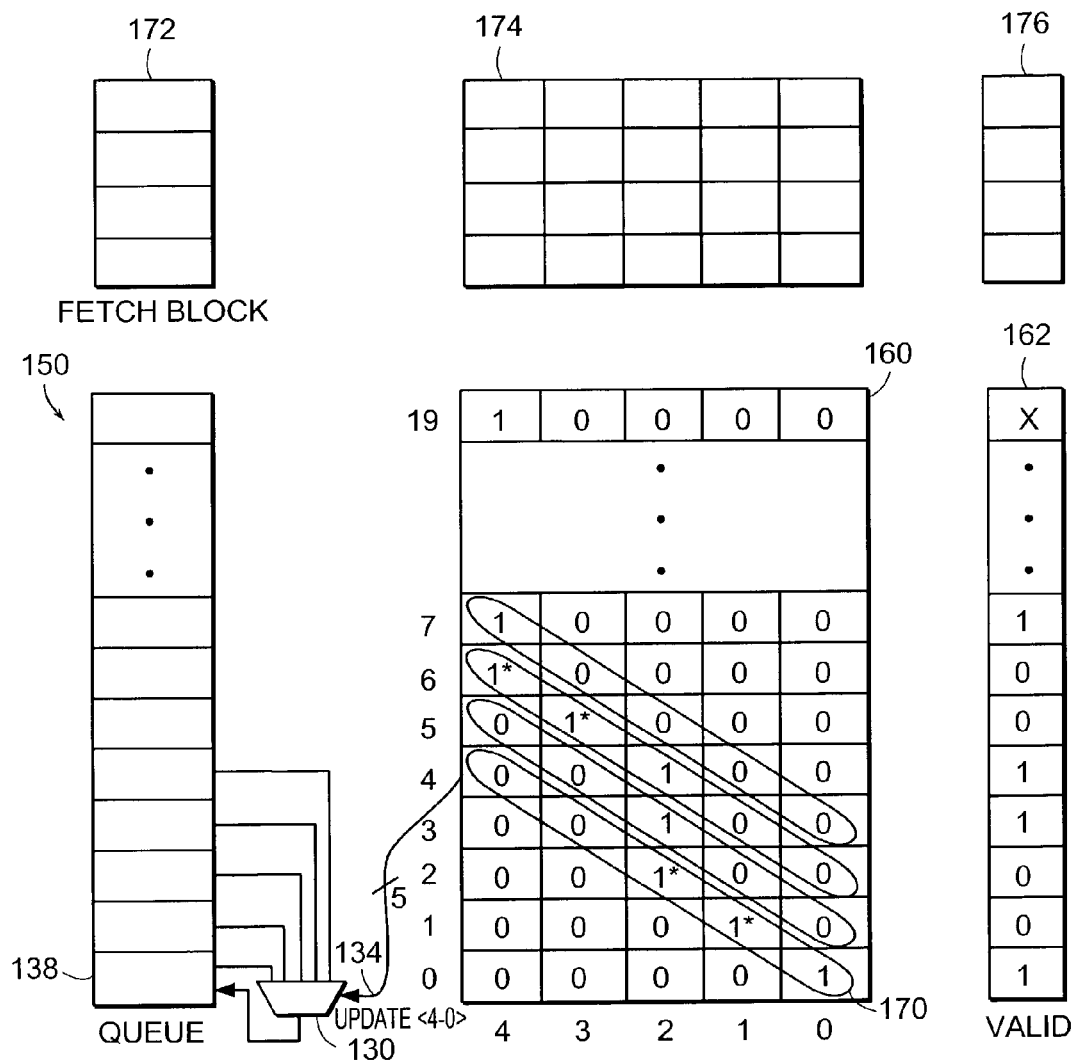
FIG. 8 is a schematic diagram illustrating a preferred method of generating the update signals from the counters.

FIG. 8 illustrates a preferred method of generating the update signals from the counters. For row 0, UPDATE<4:0> signals 134 are formed by combining the counter bits from rows 0 to 4 which lie in the diagonal 170, respectively. Each bit in the diagonal is logically ANDed with its row's valid bit to mask the count when the row contains an invalid instruction. Masked bits are indicated with asterisks (*). This has the effect of turning on only one UPDATE signal for each row when receiving a valid instruction, while shutting off all UPDATE signals for rows into which only invalid instructions would be shifted. This saves a large amount of power in the queue because invalid instructions are not moved within the queue. They are either overwritten with valid instructions or with the precharged value of the shift multiplexor 130.

Thus, for example, while the diagonal 170 corresponding to row 0 has the value <00111>, the masked UPDATE signals 134 which derive from the diagonal 170 ANDed with valid indicators for rows 0-4, or <11001>, are <00001>. This drives the multiplexor 130 to select the instruction stored in row 0. Thus the valid instruction in row 0 is not moved.

The update logic circuit 106 preferably extends beyond the queue to include four extra rows. These rows represent the four incoming instructions 172, which will enter the queue on the next cycle. Their valid bits 176 are counted and additional counters 174 are provided which affect the queue multiplexor select lines in the same manner as valid bits for instructions within the queue.

Figure 9:
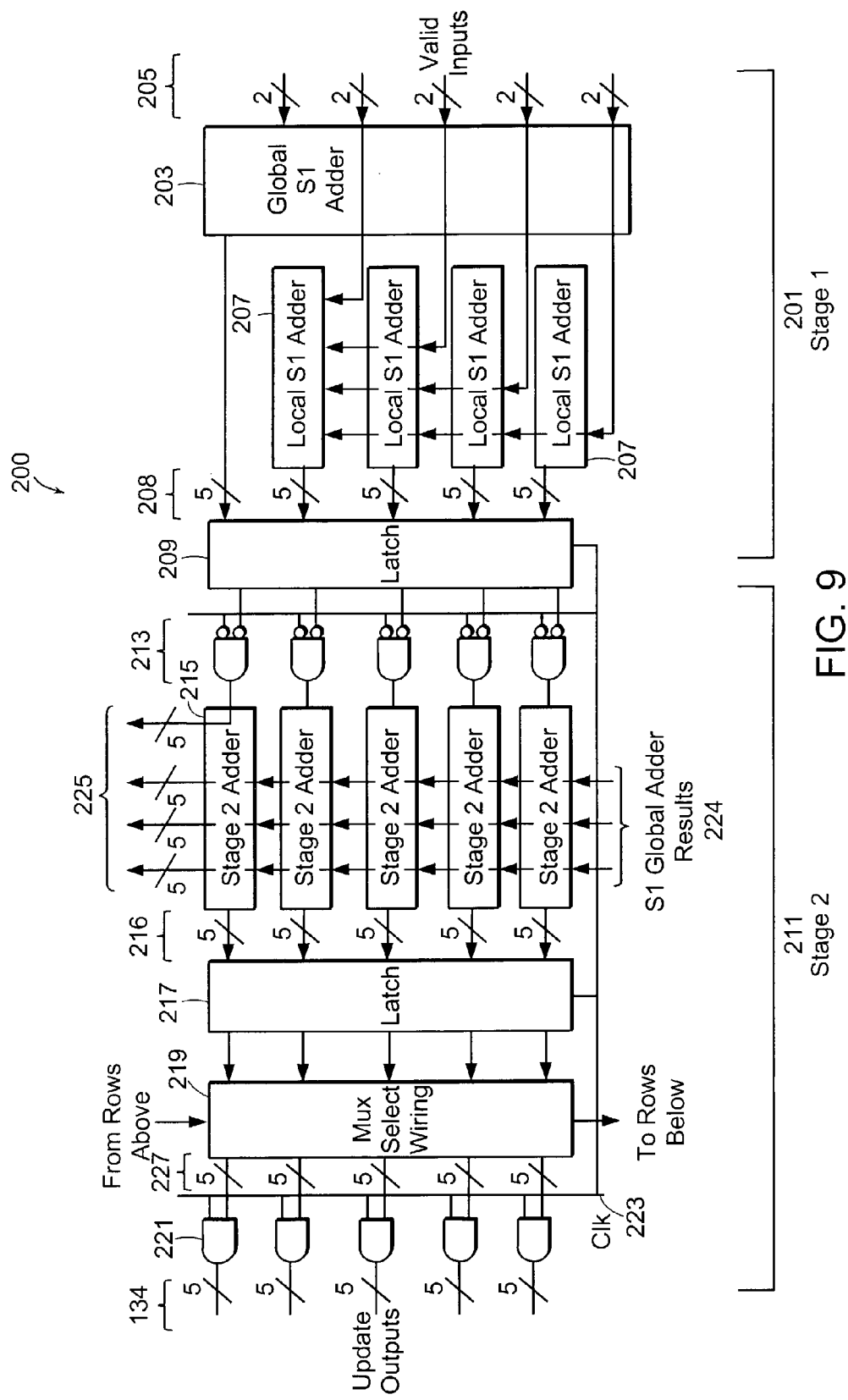
FIG. 9 is a block diagram of a preferred embodiment of the Update Logic circuit for five of the twenty queue rows.

As FIG. 9 illustrates, the update logic circuit 106 has one cycle of latency and consists of two stages, each taking one phase to complete. FIG. 9 illustrates a 5-row slice 200 of the 20-row update datapath. The structure of the datapath is similar to a carry lookahead adder, with the global adders performing the lookahead function.

Stage 1 201 counts instruction invalid bits up to and including each row and saturates at four. Stage 1 adders are broken into groups of five rows, as shown, to reduce their delay. Local adders 207 in four of the five rows sum the invalid bits in the complementary valid/invalid input pairs 205 within the group up to and including the designated row. A global adder 203 sums all five invalid bits within each group, similar to a lookahead adder. Local and global adder sums 208 are then driven into stage 2 211 through latch 209 and gates 213.

Stage 2 211 combines local and global sums 208 from stage 1 201 with Stage 1 global sums 224 from the groups below the instant group to form multiplexor selects 134 for each instruction queue row as described previously. The global sums from the groups below 224 and from the instant group are passed to the group above at 225.

The multiplexor select wiring 219 generates the update signals 227 from the diagonals of the counters as described above. The update signals 227 pass through gates 221 when enabled by clock signal 223, forming Stage 2 outputs 134. The Stage 2 outputs 134 are driven across the entire instruction queue, and control precharged NMOS pass transistor multiplexors to shift instructions within the queue.

Figure 10:
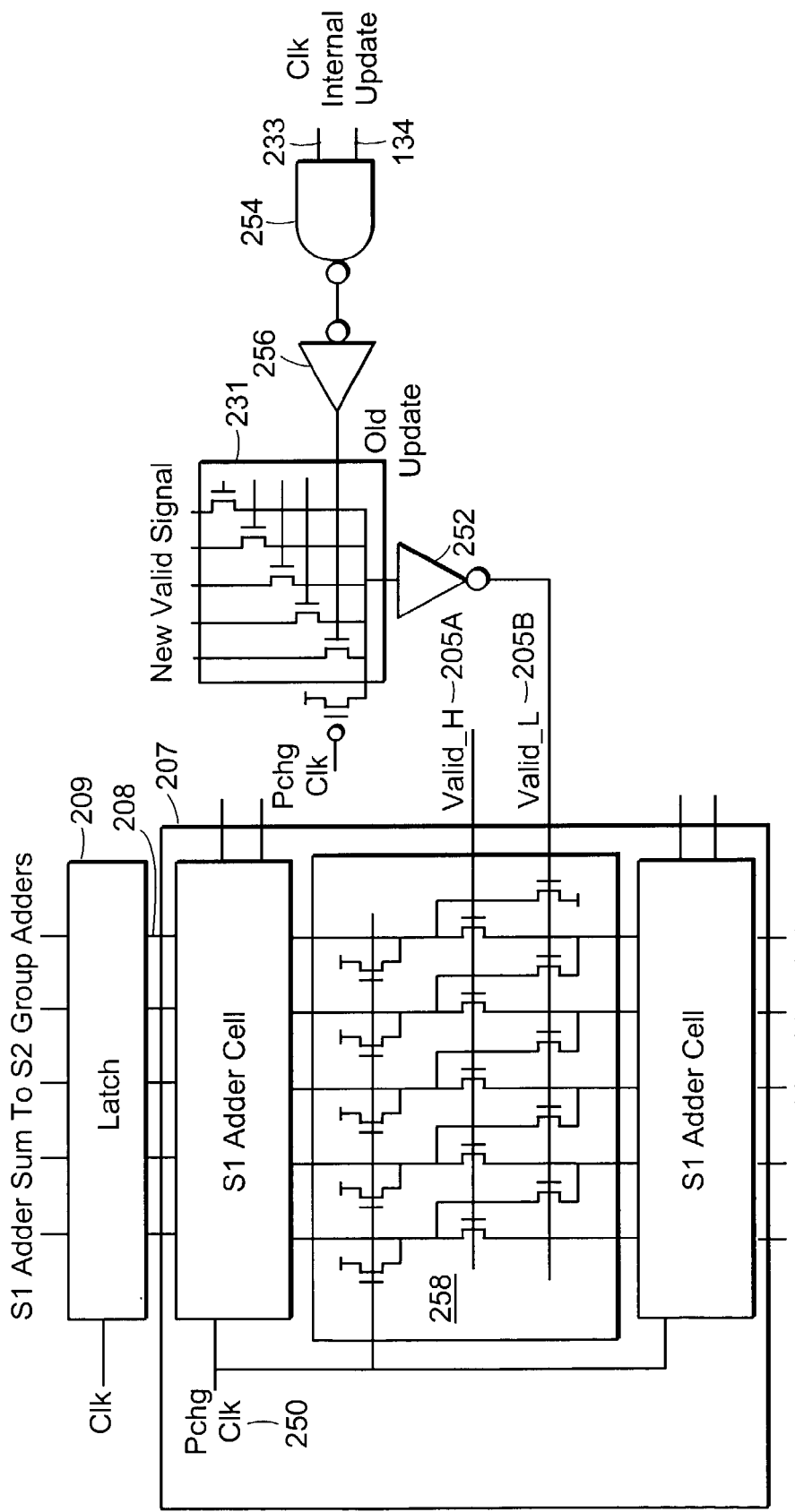
FIG. 10 is a schematic diagram of a simplified circuit of a local stage 1 adder circuit of FIG. 9.

FIG. 10 illustrates an update circuit Stage 1 adder 207 of FIG. 9 in detail.

Clock 233 has two phases, phase A and phase B. Each instruction's new valid bit is calculated from its issue signal during the clock's low assertion time, phase B. In phase A, or the high assertion time of clock 233, the valid bit is shifted into its new row through a precharged NMOS pass multiplexor 231, and dominoes into the stage 1 adder 207 using the old update multiplexor outputs 134, via gates 254 and 256. Note that complementary versions 205A, 205B of each row's valid bit are needed for the pass/shift function. The example of FIG. 10 has each of three rows drive into the stage 1 adder cells.

The adder 207 is implemented as a 5-bit precharged NMOS shifter array for fast addition, as illustrated by the center cell 258. The adder 207 adds by shifting a token left one bit for each valid entry. The five bits represent an invalid row count that saturates at four. The illustrated local adder 207 sums valid bits for three rows.

The stage 1 sum 208 is latched at 209 and driven to stage 2 in phase B. The update logic stage 2 output is turned into multiplexor selects as previously described and is driven across the issue logic datapath during the next phase A, which closes the loop.

As shown in FIG. 8, each rows' count bits are logically ANDed with that row's valid bit to mask the count when the row contains an invalid instruction. This has the effect of turning on only one UPDATE signal for each row when receiving a valid instruction, while shutting off all UPDATE signals for rows into which only invalid instructions would be shifted. This saves a large amount of power in the queue because invalid instructions are not moved within the queue: they are either overwritten with valid instructions or with the precharged value of the shift multiplexor.

However, in a preferred implementation, the two complementary valid bits associated with each instruction within the queue must be shifted properly and not dropped, even when that instruction is invalid, in order to guarantee correct results from the issue logic. These valid bits cannot simply receive the precharge value from the shift multiplexor when the row is invalid because that would destroy the information in those bits, which is needed.

Figure 11:
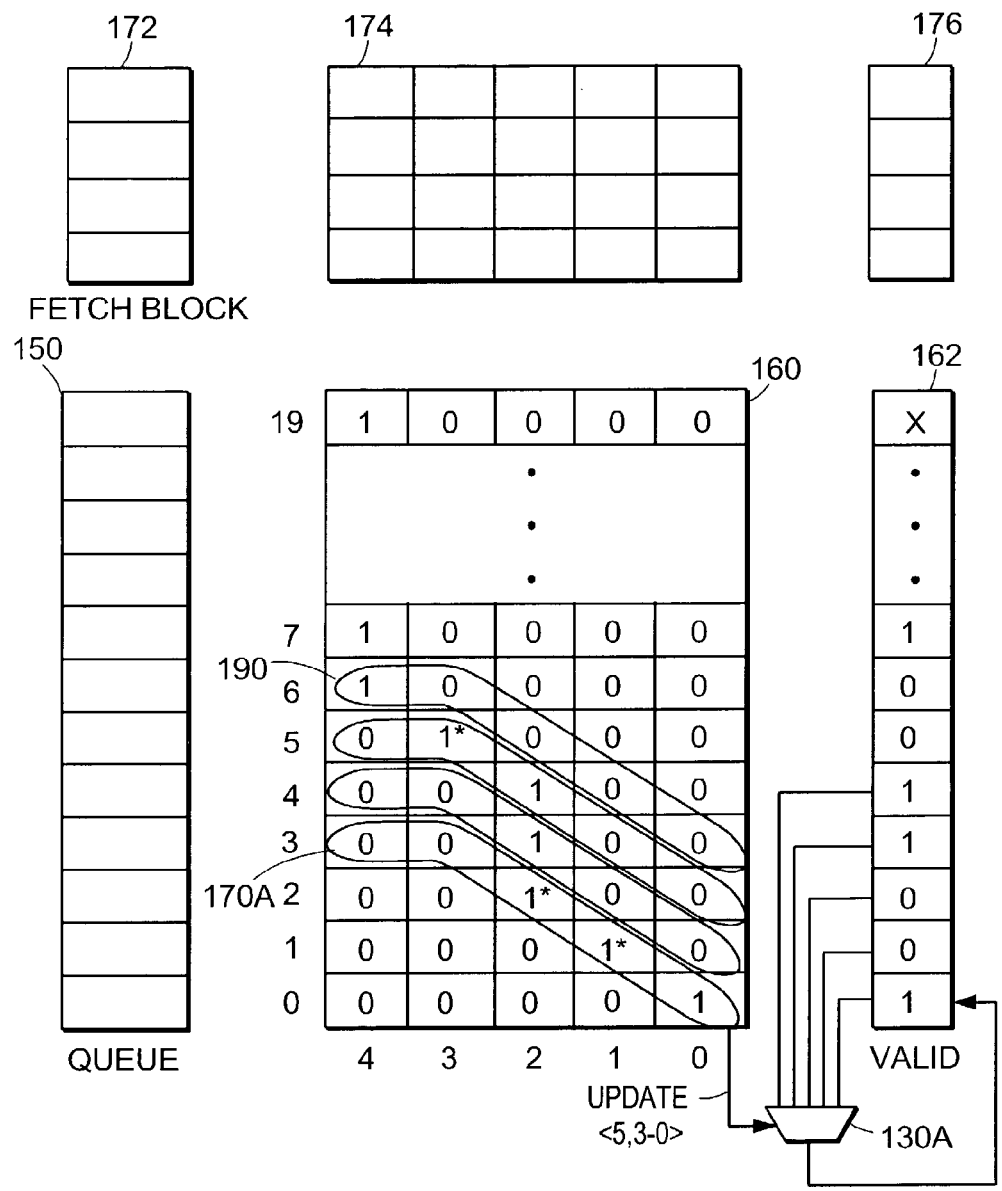
FIG. 11 is a schematic diagram illustrating a preferred implementation of generating update signals for the valid indicators.

FIG. 11 thus illustrates an implementation for generating update signals for shifting the valid indicators during compaction. A modified diagonal 170A is formed for each row. A second multiplexor 130A is associated with each queue row, using the same UPDATE<3-0> signals as the first multiplexor 130 (FIG. 8), but using an alternate select bit UPDATE<5> in place of UPDATE<4>. This alternate select UPDATE<5> is generated for each row N using the most significant bit, or count<4> wire, from row N+3, unmasked by the row's valid indicator.

This signal UPDATE<5> indicates that a count of 3 was found up to row N+3, and will become a count of 4 at row N+4 if row N+4 is invalid. If row N+4 is valid, the count stays at 3 and this bit will be off and does not conflict with UPDATE<3> which also comes from row N+3. This unmasked bit allows one UPDATE multiplexor select to remain on, thus selecting correct control values for these two bits even for invalid instructions.

Figure 12:
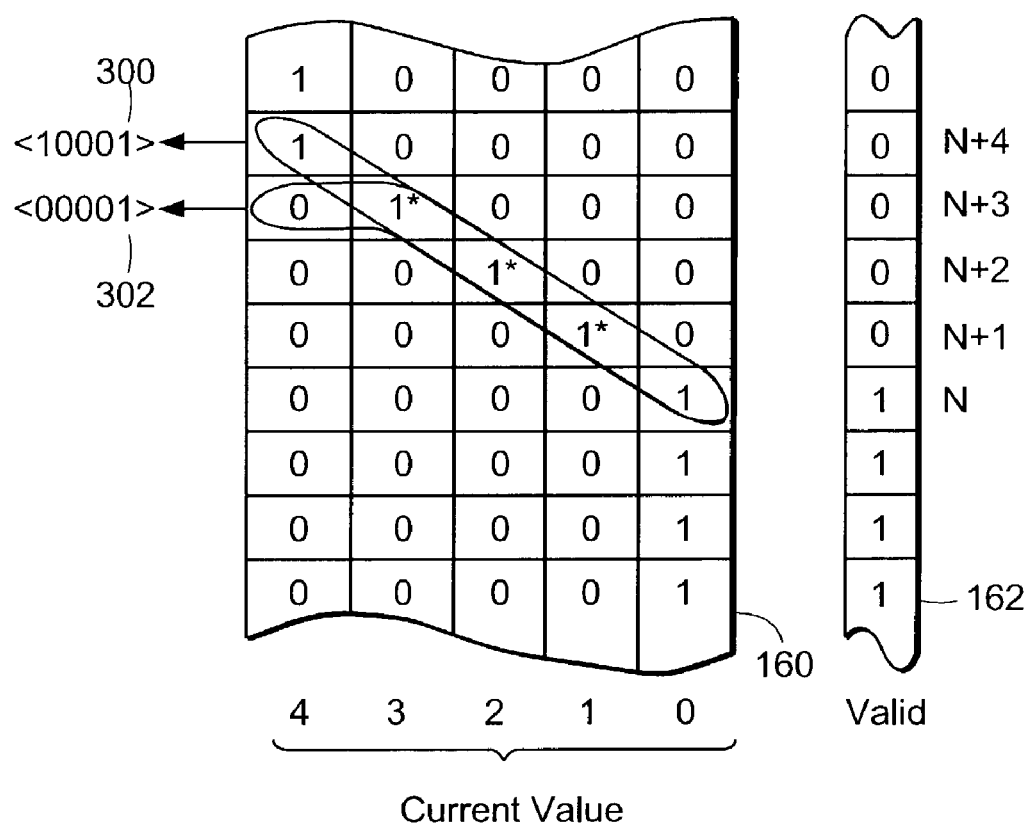
FIG. 12 is a schematic diagram illustrating a problem which the implementation shown in FIG. 11 resolves.

FIG. 12 illustrates why the unmasked UPDATE<5> bit is taken from row N+3 rather than row N+4. Assume that all rows up to and including row N hold valid instructions and that rows N+1 through N+4 do not hold valid instructions. If the unmasked UPDATE<5> signal were taken from row N+4, the count value would be <10001>300, possibly causing improper overwriting of the valid indicator for row N. On the other hand, when the UPDATE<5> signal is taken from row N+3, as in a preferred embodiment, the resulting count 302 is <00001> and there is no conflict.

Full Queue Detection
Overview

As previously discussed, each cycle, the update logic 106 compacts instructions in the queue toward the bottom. At small additional cost, the update logic circuit can provide a count of the total number of free entries in the queue in cycle K−2. This count requires 1 cycle to generate, and is not available until the beginning of cycle K−1.

In cycle K, all significant events which allocated space (decreasing the free count) or freed up space in the queue during cycle K−1 are calculated into the free count. This gives a total count of the free space available in the queue to instructions entering in cycle K. The equation is $$T_K = A_{K-2} + B_{K-1} - C_{K-1} + D_{K-1} \quad (1)$$

where $T_K$ is the number of free queue entries in cycle K, $A_{K-2}$ is the number of free queue entries in cycle K−2 as reported by the update logic circuit, $B_{K-1}$ is the issue count for cycle K−1, i.e., the number of instructions issued in cycle K−1, $C_{K-1}$ is the number of instructions enqueued in cycle K−1, and $D_{K-1}$ is the number of instructions speculatively issued in cycle K−1 which have produced a cache hit.

Speculatively issued instructions are instructions which consume the results of previously-issued producer load instructions whose cache hit/miss is not known at the time of issuance. These consumers are issued "speculatively" assuming producer cache hit, and killed if the producer load instructions miss in the cache.

In the floating-point queue, the free-entry count $T_K$ is compared to the number of instructions entering in cycle K, asserting pipeline stall during cycle K if there are not enough free slots for the entire instruction block to enter, i.e., if $T_K$ is less than the number of instructions entering. For example, when there are three free rows and three incoming instructions, the pipeline does not stall. A count of three free rows with four incoming instructions does cause a pipeline stall.

In the integer queue, a simpler, faster comparison scheme is used. Here, the pipeline is stalled if there are less than four free queue entries in any cycle, i.e., $T_K < 4$, regardless of the number of instructions in the enqueue stage that cycle. This comparison scheme is basically the fixed threshold scheme implemented for an out-of-order instruction queue.

By extending the count in the top row of the update lock to eight, for the integer queue, the queue free count is usable in the queue-full stall circuit.

A count of eight is sufficient because, in Eq. (1), a maximum of 4 is subtracted from the count, whose value must be at least 4 in order not to stall. Thus, a range of 0 to 7 is sufficient to represent the values for which a stall can occur. The update logic count circuit represents values 0-7 with explicit wires. Values of 8 or greater are represented with none of the values 0 to 7 asserted. Negative values cannot occur.

The free-row count is driven from the update logic into the queue-stall logic.

Queue Stall Logic

Figure 13:
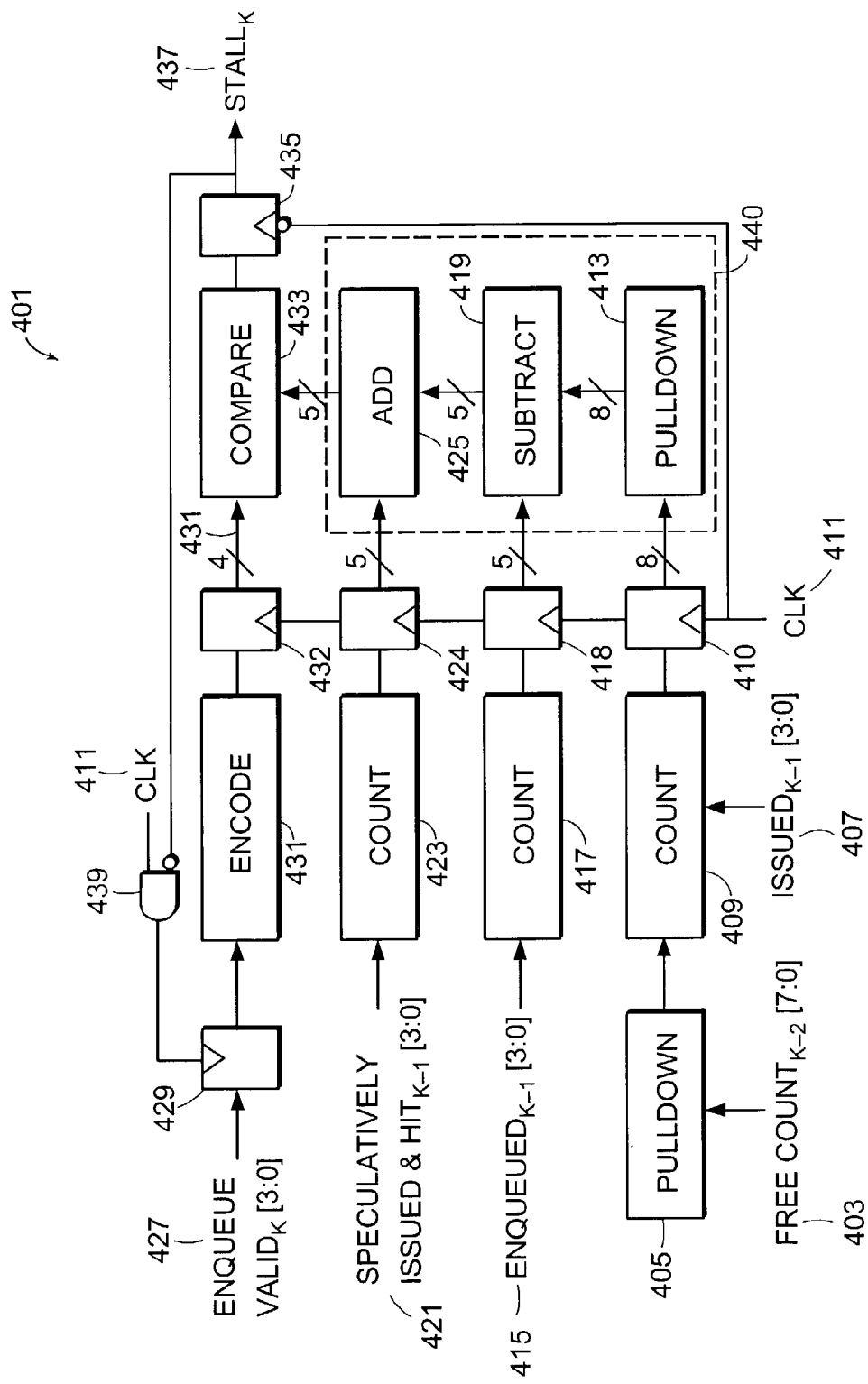
FIG. 13 is a block diagram illustrating the stall logic of a preferred embodiment of the present invention.

FIG. 13 is a block diagram illustrating the stall logic 401 of a preferred embodiment of the present invention.

The free count $A_{K-2}$ 403 comes from the update logic circuit 106 and is translated to proper voltages by pulldown circuit 405. Valid bits of instructions issued in cycle K−1 are used to add $B_{K-1}$, the number of instructions issued in cycle K−1, to the free count in counter 409. The total free count plus issued instructions, calculated by counter 409, are clocked through latch 410 to pulldown circuit 413 of the adder/subtracter circuit 440.

$C_{K-1}$, the number of instructions 415 enqueued in cycle K−1 is counted by counter 417. The enqueued instruction count from counter 417 is latched by latch 418 to the adder/subtracter circuit 440. Subtracter 419 subtracts the number of enqueued instructions in cycle K−1 from the total of the free count plus issued instructions.

$D_{K-1}$, the number of speculatively issued instructions that produce a cache hit 421 in cycle K−1 is counted by counter 423. This count is then latched by latch 424 and added at adder 425 to the result of subtracter 419.

In the floating point queue, valid indicators 427 of instructions requesting to be enqueued at cycle K are clocked by latch 429 to encoder 431 which encodes a count of valid instructions to be enqueued to simplify the later comparison. The encoded count is latched through latch 432 and compared at comparator 433 with the result of the adder/subtracter circuit 440.

Note that in the integer queue, encoder 431 is not needed because the result of the adder/subtracter circuit 440 is compared with a fixed value, 4 in the preferred embodiment.

In either embodiment, the output of comparator 433 is latched by latch 435 which is clocked by clock signal 411. The output is a stall signal 437 which is gated by gate 439 and clocked by clock signal 411 to stall the input pipeline. The stall signal is also used to disable latch 429.

The counted events do not include all possible changes to the queue contents. This is because some events, such as kills, are relatively uncommon and have little effect on the queue when averaged over a long period of time. Note that these events can only be left out if they add free entries to the queue—i.e., tradeoff a small amount of performance for area and a cycle time advantage. Thus, a conservative count of free entries is created by leaving out small positive credits to the queue accounting. This allows the implementation of the stall logic in a small area while meeting cycle time goals by using queue entries as efficiently as possible.

Figure 14:
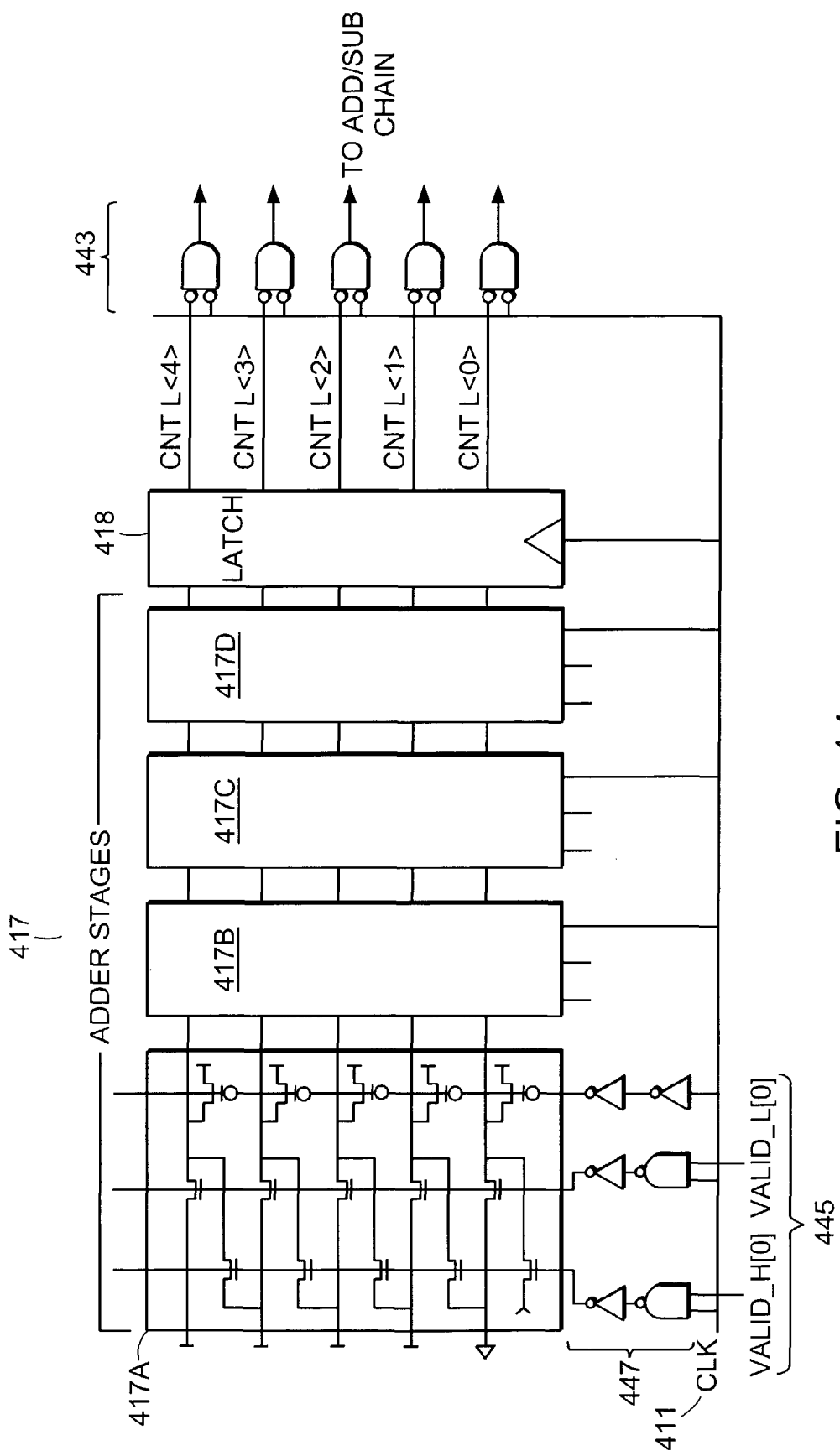
FIG. 14 is a simplified schematic illustrating the adder stages which make up the event counters of FIG. 13.

FIG. 14 illustrates a typical counter from FIG. 13, comprising several adder stages.

Each event counter, e.g., counter 417, is implemented as a precharged NMOS carry chain, and is represented as a flat, unencoded vector to enable addition by a logical right shift. For example, incrementing is accomplished by shifting the current value right one position, while decrementing is accomplished by shifting the current value left one position.

The adder 417 shown in FIG. 14 counts, for example, instructions enqueued in cycle K−1. It comprises four adder stages 417A-417D each of which can shift a bit one position to the left or right, depending on the value of the valid high and valid low complementary bits 445, which are clocked into the adder stages via clock 411 through gates 447. The resulting flat vector count is latched through latch 418 and through gates 443 to the adder/subtracter circuit 440.

Figure 15:
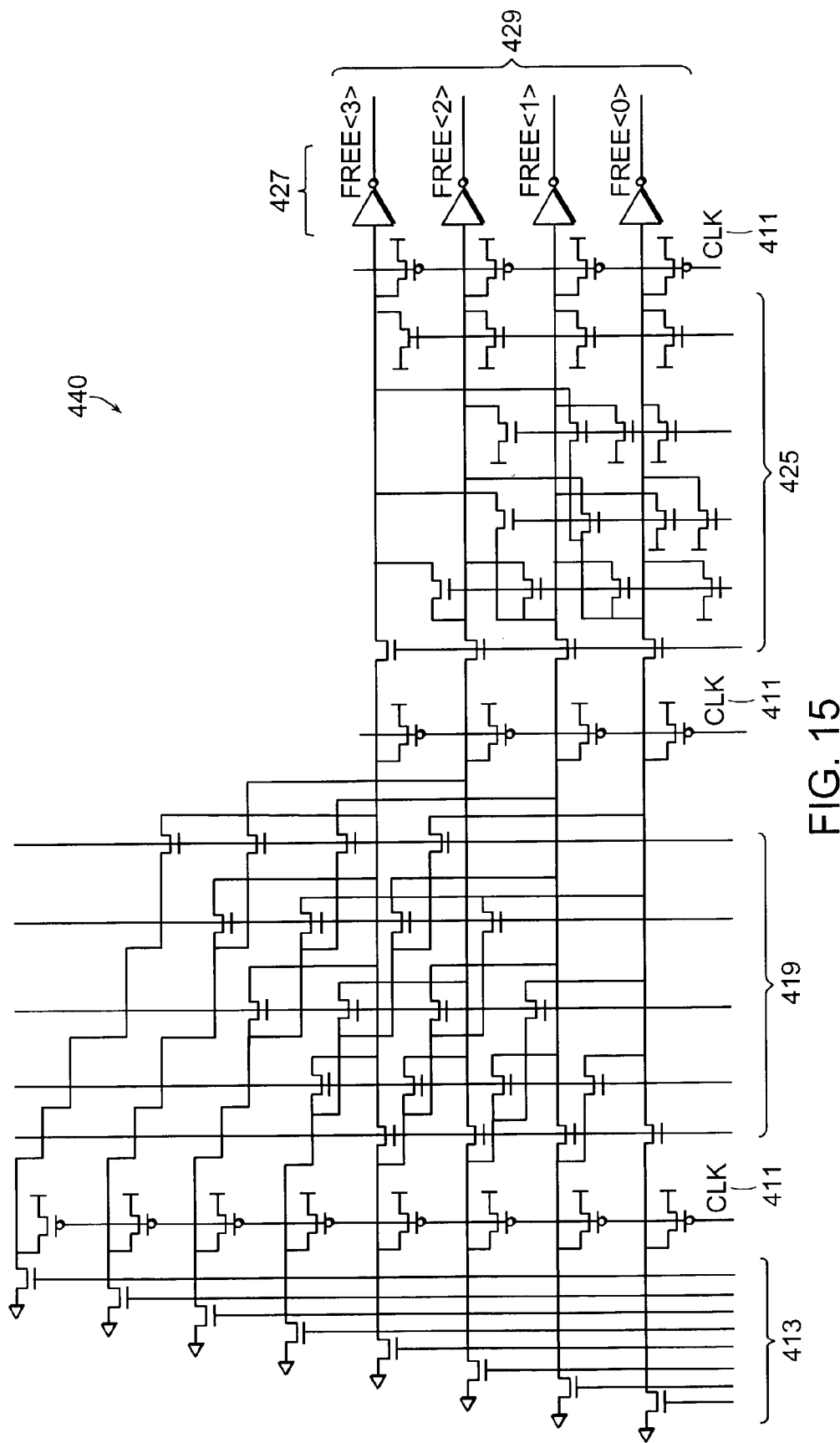
FIG. 15 is a simplified schematic of the add/subtract circuitry of FIG. 13.

FIG. 15 is a schematic of the adder/subtracter circuit 440 of FIG. 13. The output 429 of this circuit is a total count of the free entries in the queue.

The input 413 is 8 bits wide internally to handle large intermediate counts. For example, an initial free entry count of 7, less 4 enqueued instructions from the previous cycle K−1, with no instructions issued in cycle K−1, leaves a total of three free queue entries. The input pipeline must stall if there are four instructions enqueuing in the current cycle K.

The pulldown section 413 provides proper bias to the count from counter 409 (FIG. 13). This count is then clocked via clock 411 to the subtracter stage 419, the output of which requires only five bits.

The output of subtracter stage 419 is clocked via clock 411 to adder stage 425. The adder stage 425 adds the number of speculatively issued instructions from counter 423. The output of the adder stage is clocked through via clock 411, and buffered by gates 427 to comparator 433 (FIG. 13).

The output 429 of the adder/subtracter circuit 440 comprises four wires representing the total free row count for cycle K, for values between 0 and 3. Negative values cannot occur. Positive values larger than 3 result in none of the wires being asserted, indicating to the comparator that a stall cannot occur since there are at least 4 free rows in the queue.

First Embodiment Queue Enqueue Bit Counter and Stall Comparator

FIG. 16A is a simplified schematic of the comparator of FIG. 13 used with the floating-point queue embodiment. The floating-queue enqueue bit counter is preferably an encoder which simplifies the comparison operation. Rather than being a simple count of the valid bits of enqueuing entries, the count is encoded in four bits <4:1> as follows, where enqueue_count<4-1> is the output of the encoder 431.

| No. of enqueuing instructions | enqueue_count<4–1> |
|---|---|
| 1 | <0001> |
| 2 | <0011> |
| 3 | <0111> |
| 4 | <1111> |

This encoding allows generation of the stall signal by a simple comparison. Comparator circuit 433A corresponds to the comparator 433 of FIG. 13 for the floating-point embodiment. Free_entries<3-0> are the outputs 429 of the adder/subtracter circuit of FIG. 15.

stall=(free_entries<3> & enqueue_count<4>)|
(free_entries<2> & enqueue_count<3>)|
(free_entries<1> & enqueue_count<2>)|
(free_entries<0> & enqueue_count<1>

Second Embodiment Queue Stall Comparator

FIG. 16B is a simplified schematic of the comparator of FIG. 13 used with the integer queue. The integer queue has a simplified queue comparator 433B, corresponding to 433 of FIG. 13 for the integer embodiment, to save space. Performance studies have indicated that the performance degradation as a result of this simplification is acceptable.

The integer queue stall in any cycle when there are less than four free queue entries, independent of the number of enqueuing instructions in that cycle. Thus, the integer embodiment does not require an encoder. Inputs to the comparator 433B are the free_entries<3-0> count 429 and a clock signal 411. The generation of the stall signal is thus reduced to:

stall=free_entries<3>|free_entries<2>|free_entries<1>|free_entries<0>

Design Tradeoffs

Figure 17A:
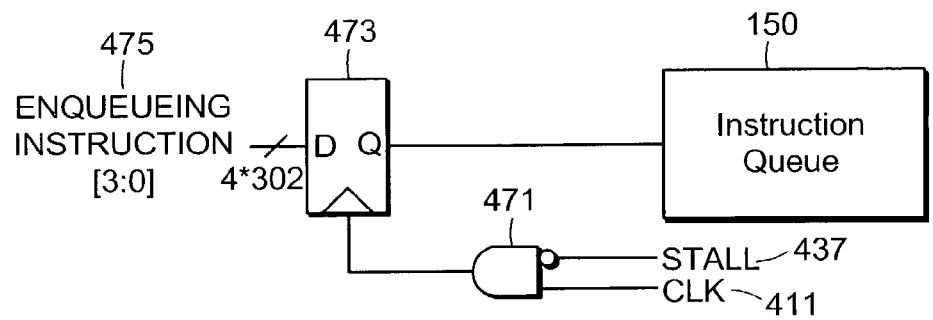
FIGS. 17A and 17B are simplified schematic illustrating a pipeline enqueue stage for an early stall, as in the present invention, and for a late stall, respectively.

FIG. 17A illustrates a pipeline enqueue stage for an early stall, as in the present invention. Stall signal 437 is gated through gate 471 by clock 411 to buffer 473, which stalls the enqueuing instructions 475 when the stall signal 437 is asserted. When stall is not asserted, the instructions 475 are passed to the instruction queue 150.

A system design target frequency of 600MHz makes generation and usage of any stall signal an inherently critical path. Pipelining the stall generation over multiple cycles enables the generation of an accurate stall signal which uses the storage space efficiently by not causing a large number of false stalls.

There are a number of design tradeoffs between early availability of the stall signal and methods of stalling the front-end pipeline. If an instruction block is to be fetched in cycle K, it must be held at the queue input in cycle K+1 for enqueue in following cycles.

Figure 17B:
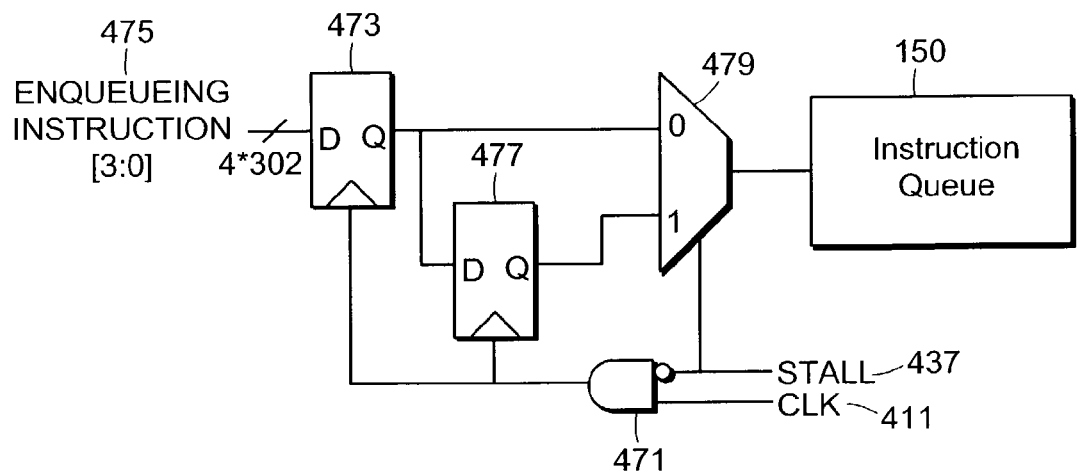

As shown in FIG. 17B, if the stall signal is too late in cycle K to prevent opening the input pipeline latch in cycle K+1, an extra "stall silo" pipe stage 477 has to be added, along with a multiplexor 479, to hold the frozen instructions which did not get enqueued. This is a huge area penalty and is not practical to implement. Thus, this constrained the stall signal for instructions enqueuing in cycle K to arrive early in cycle K.

Figure 18:
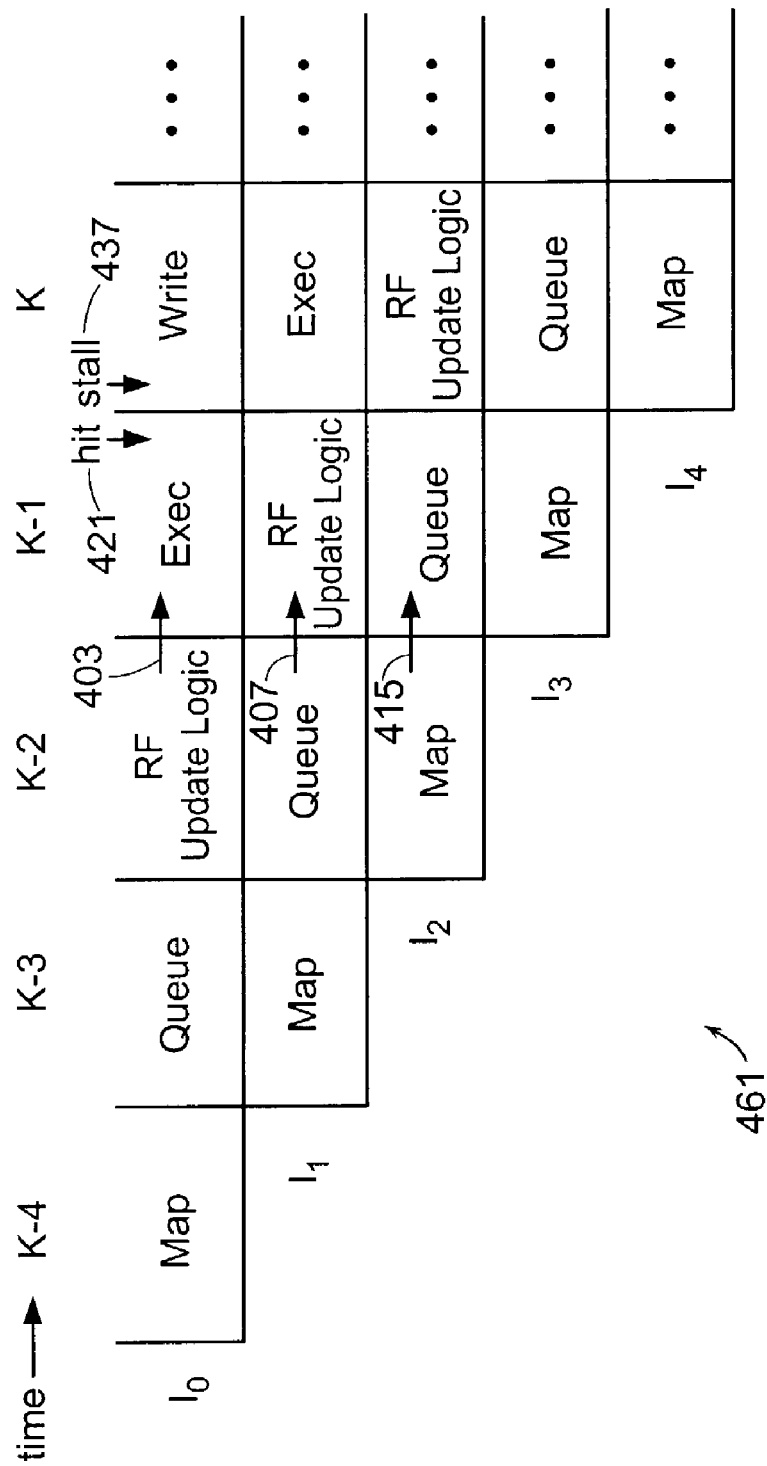
FIG. 18 is a schematic diagram illustrating the relative stages through the pipeline of various instructions.

FIG. 18 is a schematic diagram illustrating the relative stages through the pipeline 461 for various instructions. Each instruction $I_0$-$I_4$ has been mapped at a different cycle K−4 through K, respectively. The object is to determine the stall signal for each, in particular, for illustration, cycle K. In cycle K−2, the update logic produces a free count 403 of the queue which is available at cycle K−1. At cycle K−1 instruction, $I_1$ and other instructions are issued from the queue and that count 407 made available to the stall logic.

During this same cycle K−1 instruction $I_2$ is enqueued. The number of enqueued instructions 415 is counted and made available in this cycle K−1. In addition, the number of speculatively issued instructions which have produced hits 421 are also counted and included in the computation. As a result the stall signal 437 is produced or not produced for instruction $I_3$ in Cycle K.

While this invention has been particularly shown and described with references to preferred embodiments thereof, it will be understood by those skilled in the art that various changes in form and details may be made therein without departing from the spirit and scope of the invention as defined by the appended claims.

What is claimed is:

1. In a pipelined computer architecture, a method for detecting instruction queue status at a cycle K, instructions capable of being removed from the queue out of sequence, the method comprising:
   determining a number of invalid instructions in the queue during cycle K−2;
   determining a number of instructions issued from the queue during cycle K−1;
   determining a number of instructions enqueued in the queue during cycle K−1; and
   determining a value indicative of a number of free rows in the queue at cycle K as the sum of the number of invalid instructions and the number of issued instructions, less the number of enqueued instructions, wherein the number of invalid instructions, the number of issued instructions, and the number of enqueued instructions are each represented as a flat vector, and wherein adding comprises shifting in one direction, and subtracting comprises shifting in an opposite direction.

2. In a pipelined computer architecture, a method for detecting instruction queue status at a cycle K, instructions capable of being removed from the queue out of sequence, the method comprising:

determining a number of invalid instructions in the queue during cycle K−2;
determining a number of instructions issued from the queue during cycle K−1;
determining a number of instructions enqueued in the queue during cycle K−1;
responsive to the number of invalid instructions, the number of instructions issued, and the number of enqueued instructions, determining a value indicative of a number of free rows in the queue at cycle K; and
determining a count of instructions speculatively issued in cycle K−1 that have produced a cache hit, the indicative value being additionally responsive to the count of speculatively issued instructions.

3. An apparatus in a pipelined computer architecture, for detecting instruction queue status at a cycle K, instructions capable of being removed from the queue out of sequence, comprising:
means for determining a number of free rows in the queue during cycle K−2;
means for determining a number of instructions issued from the queue during cycle K−1;
means for determining a number of instructions enqueued in the queue during cycle K−1; and
an adder/subtracter which determines a value indicative of the number of invalid instructions in the queue at cycle K, including subtracting the number of enqueued instructions from the sum of the number of free rows and the number of issued instructions to produce a remainder, the remainder being the indicative value, wherein the number of free rows, the number of issued instructions, and the number of enqueued instructions are each represented as a flat vector, and wherein the adder/subtracter adds by shifting in one direction, and subtracts by shifting in an opposite direction.

4. An apparatus, in a pipelined computer architecture, for detecting instruction queue status at a cycle K, instructions capable of being removed from the queue out of sequence, comprising:
means for determining a number of invalid instructions in the queue during cycle K−2;
means for determining a number of instructions issued from the queue during cycle K−1;
means for determining a number of instructions enqueued in the queue during cycle K−1;
an adder/subtracter which, responsive to the number of invalid instructions, the number of instructions issued, and the number of enqueued instructions, determines a value indicative of the number of invalid instructions in the queue at cycle K; and
an adder which, responsive to a count of instructions speculatively issued a cycle K−1 which have produced a cache hit, is used in further determining the indicative value.

5. The apparatus of claim 4, wherein the indicative value is equal to the sum of the number of invalid instructions in the queue during cycle K−2, the number of issued instructions, and the count of speculatively issued instructions, less the number of enqueued instructions.

6. In a pipelined computer, a queue status detection circuit for detecting instruction queue status at a cycle K, instructions capable of being removed from the queue out of sequence, comprising:
a counter circuit for determining a number of free rows in the queue during cycle K−2;
a counter circuit for determining a number of instructions issued from the queue during cycle K−1;
a counter circuit for determining a number of instructions enqueued in the queue during cycle K−1; and
an adder/subtracter circuit which subtracts the number of enqueued instructions from the sum of the number of free rows and the number of issued instructions to produce a remainder, the remainder being a value indicative of the number of invalid instructions in the queue at cycle K, wherein the number of free rows, the number of issued instructions, and the number of enqueued instructions are each represented as a flat vector, and wherein the adder/subtracter circuit adds by shifting in one direction, and subtracts by shifting in an opposite direction.

7. In a pipelined computer, a queue status detection circuit for detecting instruction queue status at a cycle K, instructions capable of being removed from the queue out of sequence, comprising:
a counter circuit for determining a number of invalid instructions in the queue during cycle K−2;
a counter circuit for determining a number of instructions issued from the queue during cycle K−1;
a counter circuit for determining a number of instructions enqueued in the queue during cycle K−1; and
an adder/subtracter circuit which, responsive to the number of invalid instructions, the number of instructions issued, and the number of enqueued instructions, determines a value indicative of the number of invalid instructions in the queue at cycle K; and
an adder circuit which, responsive to a count of instructions speculatively issued in cycle K−1 which have produced a cache hit, is used in further determining the indicative value.

8. The queue status detection circuit of claim 7, wherein the indicative value is equal to the sum of the number of invalid instructions in the queue during cycle K−2, the number of issued instructions, and the count of speculatively issued instructions, less the number of enqueued instructions.

9. In a pipelined computer architecture, a method for detecting instruction queue status at a particular cycle K, wherein instructions may be removed from the queue out of sequence, the method comprising:
determining, in the particular cycle, a value indicative of a number of free rows in the queue, responsive to
the number of invalid instructions that were in the queue during cycle K−2,
the number of instructions that issued from the queue during cycle K−1, and
the number of instructions that were enqueued in the queue during cycle K−1; and
stalling an instruction pipeline if the determined indicative value exceeds a threshold.

10. The method of claim 9, the indicative value exceeding the threshold being indicative that there is an insufficient number of free rows in which new instructions can be placed.

11. The method of claim 10, there being an insufficient number of free rows if there are not enough free rows available for all of the instructions of an entering instruction block.

12. The method of claim 10, there being an insufficient number of free rows if there are less than a predetermined number of free queue entries.

13. The method of claim 9, the step of determining the indicative value being additionally responsive to a number of instructions speculatively issued in cycle K−1 that have produced a cache hit.

14. The method of claim 9, further comprising:
using carry chains to count respectively the numbers of invalid instructions, issued instructions, and enqueued instructions, each count being represented as a vector.

15. An apparatus, in a pipelined computer architecture, detecting instruction queue status at a particular cycle K, instructions capable of being removed from the queue out of sequence, comprising:
- means for determining, in the particular cycle, a value indicative of a number of free rows in the queue, responsive to
  - the number of invalid instructions that were in the queue during cycle K−2,
  - the number of instructions that issued from the queue during cycle K−1, and
  - the number of instructions that were enqueued in the queue during cycle K−1; and
- means for stalling an instruction pipeline if the determined indicative value exceeds a threshold.

16. The apparatus of claim 15, the indicative value exceeding the threshold being indicative that there is an insufficient number of free rows in which new instructions can be placed.

17. The apparatus of claim 16, there being an insufficient number of free rows if there are not enough free rows available for all of the instructions of an entering instruction block.

18. The apparatus of claim 16, there being an insufficient number of free rows if there are less than a predetermined number of free queue entries.

19. The queue status detection circuit of claim 18, the predetermined value being related to a maximum number of instructions that can be enqueued in one cycle.

20. The apparatus of claim 15, the indicative value being additionally responsive to a number of instructions speculatively issued in cycle K−1, that have produced a cache hit.

21. The apparatus of claim 15, further comprising:
- carry chains that count respectively the numbers of invalid instructions, issued instructions, and enqueued instructions, each count being represented as a vector.

* * * * *

UNITED STATES PATENT AND TRADEMARK OFFICE
CERTIFICATE OF CORRECTION

| | | |
|---|---|---|
| PATENT NO. | : 8,090,930 B2 | Page 1 of 1 |
| APPLICATION NO. | : 10/356943 | |
| DATED | : January 3, 2012 | |
| INVENTOR(S) | : Timothy Charles Fischer et al. | |

It is certified that error appears in the above-identified patent and that said Letters Patent is hereby corrected as shown below:

In column 13, line 16, in Claim 3, delete "apparatus" and insert -- apparatus, --, therefor.

In column 13, line 53, in Claim 4, delete "a cycle" and insert -- in cycle --, therefor.

In column 16, line 7, in Claim 19, delete "queue status detection circuit" and insert -- apparatus --, therefor.

Signed and Sealed this
Eleventh Day of December, 2012

David J. Kappos
*Director of the United States Patent and Trademark Office*